(12) United States Patent
M et al.

(10) Patent No.: US 12,430,378 B1
(45) Date of Patent: Sep. 30, 2025

(54) APPARATUS AND METHOD FOR NOTE DATA ANALYSIS TO IDENTIFY UNMET NEEDS AND GENERATION OF DATA STRUCTURES

(71) Applicant: nference, Inc., Cambridge, MA (US)

(72) Inventors: Praveen Kumar M, Bangalore (IN); Rakesh Barve, Bengaluru (IN)

(73) Assignee: nference, Inc., Cambridge, MA (US)

( * ) Notice: Subject to any disclaimer, the term of this patent is extended or adjusted under 35 U.S.C. 154(b) by 0 days.

(21) Appl. No.: 18/784,257

(22) Filed: Jul. 25, 2024

(51) Int. Cl.
*G06F 40/00* (2020.01)
*G06F 16/31* (2019.01)
(Continued)

(52) U.S. Cl.
CPC ........... *G06F 16/383* (2019.01); *G06F 16/31* (2019.01); *G06F 16/35* (2019.01); *G06F 40/284* (2020.01)

(58) Field of Classification Search
CPC ........ G06F 40/30; G06F 40/10; G06F 40/151; G06F 40/16; G06F 40/20; G06F 40/205; G06F 40/279; G06F 40/295; G06F 40/35; G06F 40/40; G06F 40/47; G06F 40/56; G06F 40/58; G06F 40/289; G06F 40/284; G06F 40/242; G06F 40/247; G06F 40/237; G06F 40/253; G06F 40/268; G06F 40/274; G06F 16/243; G06F 21/1014; G06F 21/6218; G06F 16/215; G06N 7/01;
(Continued)

(56) References Cited

U.S. PATENT DOCUMENTS 11,676,735 B2 * 6/2023 Wang ..................... G06N 20/00 705/3
12,020,814 B1 * 6/2024 McNair .................. G16H 50/70
(Continued)

FOREIGN PATENT DOCUMENTS

| CN | 112749277 A | 5/2021 |
| WO | 2022232850 A1 | 11/2022 |
| WO | 2023204000 A1 | 10/2023 |

OTHER PUBLICATIONS

J. Zhang and D. Chang, "Semi-Supervised Patient Similarity Clustering Algorithm Based on Electronic Medical Records," in IEEE Access, vol. 7, pp. 90705-90714, 2019. (Year: 2019).*

*Primary Examiner* — Edgar X Guerra-Erazo
(74) *Attorney, Agent, or Firm* — Caldwell Intellectual Property Law

(57) ABSTRACT

Apparatus and method for data analysis for unmet need identification, solution distillation and data structure generation are disclosed. The apparatus includes at least a processor and a memory communicatively connected to the at least a processor. The memory contains instructions configuring the at least a processor to receive a plurality of sets of note data, determine a plurality of operational language elements from the plurality of sets of note data, wherein the plurality of operational language elements includes an unmet need language element, generate an element control datum as a function of the unmet need language element of the plurality of operational language elements, classify the plurality of operational language elements into one or more element groups, generate a note data structure as a function of the one or more element groups and the element control datum, and display the note data structure using a graphical user interface.

20 Claims, 13 Drawing Sheets

(51) Int. Cl.
*G06F 16/35* (2019.01)
*G06F 16/383* (2019.01)
*G06F 40/284* (2020.01)

(58) Field of Classification Search
CPC ........ G06N 20/00; G06N 20/10; G06N 20/20;
G06N 7/02; G06N 7/023; G06N 7/026;
G06N 3/044; G06N 3/0442; G06N 3/045;
G06N 3/0455; G06N 3/0464; G06N
3/047; G06N 3/0475; G06N 3/048; G06N
3/08; G06N 3/082; G06N 3/084; G06N
3/088; G06N 3/0895; G06N 3/09; G06N
3/091; G06N 3/092; G06N 3/094; G06N
3/096; G06N 3/098; G06N 3/0985; G06N
5/01; G06N 5/02; G06N 5/04; G06N
5/042; G06N 5/043; G06N 5/045; G06N
5/046; G06N 5/047; G06N 5/048; G06N
5/041; G06N 3/042; G06N 3/02
USPC .............................. 704/1, 2, 4, 5, 7, 9, 257
See application file for complete search history.

(56) References Cited

U.S. PATENT DOCUMENTS

| | | | |
|---|---|---|---|
| 2012/0245950 A1* | 9/2012 | Morrissey | G06Q 30/02 |
| | | | 705/2 |
| 2021/0057068 A1* | 2/2021 | Dandala | G16H 15/00 |
| 2023/0395256 A1 | 12/2023 | Glass et al. | |

\* cited by examiner

APPARATUS AND METHOD FOR NOTE DATA ANALYSIS TO IDENTIFY UNMET NEEDS AND GENERATION OF DATA STRUCTURES

FIELD OF THE INVENTION

The present invention generally relates to the field of data structures. In particular, the present invention is directed to apparatus and method for note data analysis to identify unmet needs and generation of data structures.

BACKGROUND

In the modern healthcare industry, medical professionals generate a vast amount of patient data through clinical notes, and other documentation. These medical notes are essential for patient care, as they contain critical information about patient history, symptoms, treatment plans, and physician observations. However, the sheer volume and unstructured nature of these notes pose significant challenges for efficient data management, retrieval, and analysis. Current methods for managing and analyzing medical notes primarily rely on manual efforts, which are time-consuming and prone to inaccuracies and inefficiencies.

SUMMARY OF THE DISCLOSURE

In an aspect, an apparatus for note data analysis for unmet need identification, solution distillation and data structure generation is disclosed. The apparatus includes at least a processor and a memory communicatively connected to the at least a processor. The memory contains instructions configuring the at least a processor to receive a plurality of sets of note data, wherein the plurality of sets of note data includes a variety of information related to a plurality of subjects generated by a plurality of users, determine a plurality of operational language elements from the plurality of sets of note data, generate an element control datum as a function of the unmet need language element of the plurality of operational language elements, classify the plurality of operational language elements into one or more element groups, generate a note data structure as a function of the one or more element groups and the element control datum, and display the note data structure using a graphical user interface.

In another aspect, a method for note data analysis for unmet need identification, solution distillation and data structure generation is disclosed. The method includes receiving, using at least a processor, a plurality of sets of note data, wherein the plurality of sets of note data includes a variety of information related to a plurality of subjects generated by a plurality of users, determining, using the at least a processor, a plurality of operational language elements from the plurality of sets of note data, generating, using the at least a processor, an element control datum as a function of the unmet need language element of the plurality of operational language elements, classifying, using the at least a processor, the plurality of operational language elements into one or more element groups, generating, using the at least a processor, a note data structure as a function of the one or more element groups and the element control group, and displaying, using the at least a processor, the note data structure using a graphical user interface.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for note data analysis for unmet need identification, solution distillation and data structure generation. The apparatus includes at least a processor and a memory communicatively connected to the at least a processor. The memory contains instructions configuring the at least a processor to receive a plurality of sets of note data, wherein the plurality of sets of note data includes a variety of information related to a plurality of subjects generated by a plurality of users, determine a plurality of operational language elements from the plurality of sets of note data, generate an element control datum as a function of the unmet need language element of the plurality of operational language elements, classify the plurality of operational language elements into one or more element groups, generate a note data structure as a function of the one or more element groups and the element control datum, and display the note data structure using a graphical user interface.

Figure 1:
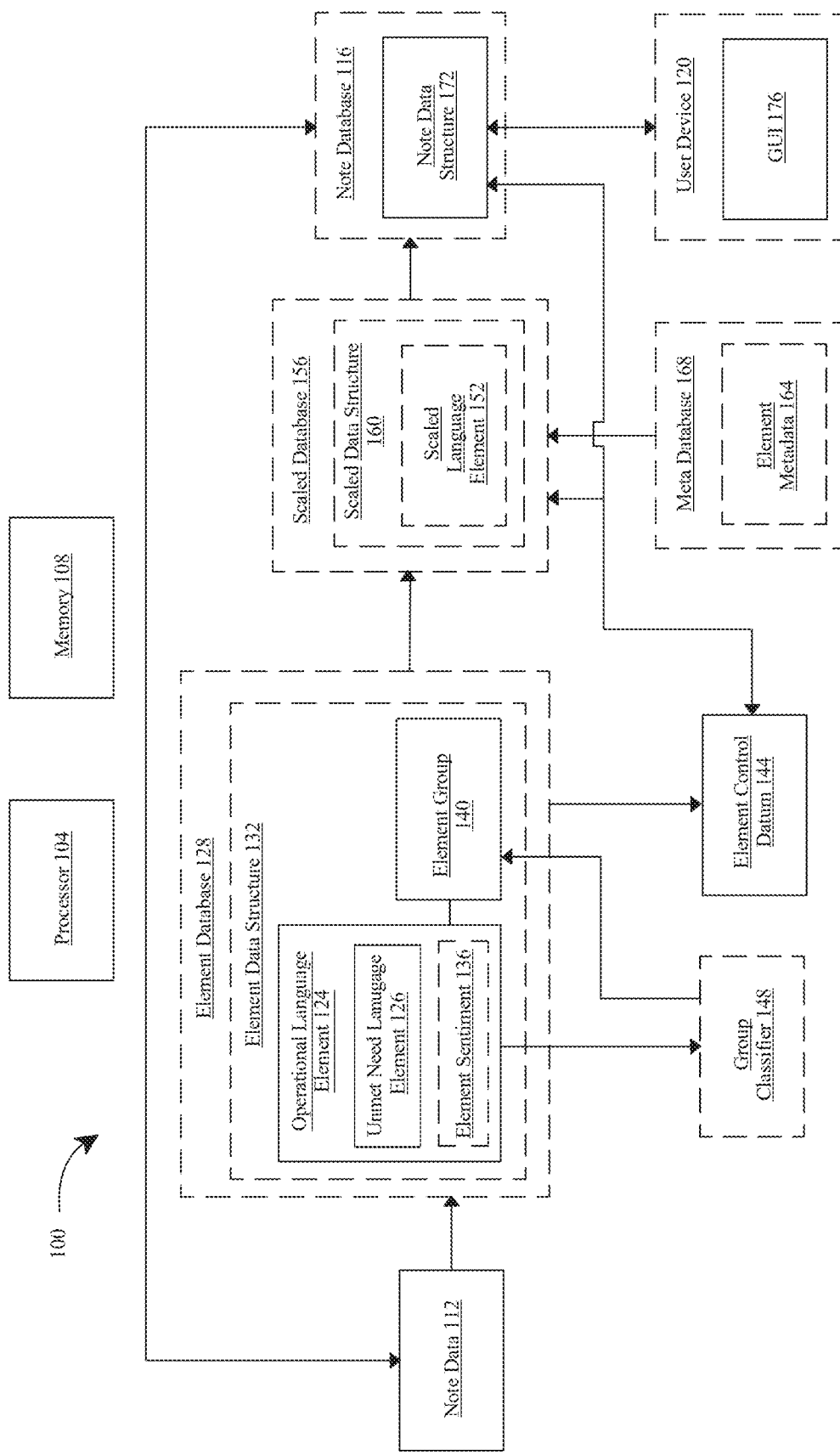
FIG. 1 illustrates a block diagram of an exemplary apparatus for note data analysis for unmet need identification, solution distillation and data structure generation.

Referring now to FIG. 1, an exemplary embodiment of an apparatus 100 for note data analysis for unmet need identification, solution distillation and data structure generation is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive a plurality of sets of note data 112. For the purposes of this disclosure, "note data" is data related to a variety of unstructured data related to a plurality of subjects. For the purposes of this disclosure, a "subject" is an individual who receives medical care, treatment, or consultation from a user. As a non-limiting example, subject may include a patient. The user disclosed herein is further described below. As a non-limiting example, note data 112 may include electronic health record (EHR) data. For the purposes of this disclosure, an "electronic health record" is the systematized collection of patient and population electronically stored health information in a digital format. For example, and without limitation, note data 112 may include range of data, including patient demographics, patient identifier, medical history, medication and allergies, immunization status, laboratory test results, radiology images, vital signs, personal statistics like age and weight, billing information, and the like. For example, and without limitation, note data 112 may include medical professional's note related to a patient. In a nonlimiting example, note data 112 may include medical professional's notes related to a disease that has been failed to be treated. As another non-limiting example, note data 112 may include a physical notes from clinicians related to patients. In some embodiments, note data 112 may be stored in a note database 116 as described further in detail below. In some embodiments, processor 104 may retrieve note data 112 from note database 116. In some embodiments, a user may manually input note data 112 into processor 104.

With continued reference to FIG. 1, processor 104 may receive note data 112 using an application programming interface (API). As used in the current disclosure, an "application programming interface" is a software interface for two or more computer programs to communicate with each other. As a non-limiting example, API may include EHR APIs, telemedicine APIs, and the like. An application programming interface may be a type of software interface, offering a service to other pieces of software. In contrast to a user interface, which connects a computer to a person, an application programming interface may connect computers or pieces of software to each other. An API may not be intended to be used directly by a person (e.g., the end user) other than a computer programmer who is incorporating it into the software. An API may be made up of different parts which act as tools or services that are available to the programmer. A program or a programmer that uses one of these parts is said to call that portion of the API. The calls that make up the API are also known as subroutines, methods, requests, or endpoints. An API specification may define these calls, meaning that it explains how to use or implement them. One purpose of API may be to hide the internal details of how a system works, exposing only those parts a programmer will find useful and keeping them consistent even if the internal details later change. An API may be custom-built for a particular pair of systems, or it may be a shared standard allowing interoperability among many systems. The term API may be often used to refer to web APIs, which allow communication between computers that are joined by the internet. API may be configured to query for web applications in order to retrieve note data 112 to another web application, database (e.g., note database 116), medical center patient portal, and the like. An API may be further configured to filter through web applications according to a filter criterion. In this disclosure, "filter criteria" are conditions the web applications must fulfill in order to qualify for API. Web applications may be filtered based on these filter criteria. Filter criteria may include, without limitation, types of medical facilities, location of the medical facility, and the like.

With continued reference to FIG. 1, in some embodiments, processor 104 may receive note data 112 from user device 120. For the purposes of this disclosure, a "user device" is any device a user can use to input data into apparatus 100. As a non-limiting example, user device 120 may include a laptop, desktop, tablet, mobile phone, smart phone, smart watch, kiosk, smart headset, or things of the like. For the purposes of this disclosure, a "user" is any person, individual, organization or entity that is using or has used an apparatus. As a non-limiting example, user may include a physician, clinician, nurses, doctors, medical professionals, hospitals, medical organization, and the like. In some embodiments, user device 120 may include an interface configured to receive inputs from user. In some embodiments, user may manually input any data into apparatus 100 using user device 120. In some embodiments, user may have a capability to process, store or transmit any information independently.

With continued reference to FIG. 1, in some embodiments, apparatus 100 may include a note database 116. As used in this disclosure, "note database" is a data store configured to store data associated with note data. As a non-limiting example, note database 116 may store note data 112, information related to patients or users, and the like. In one or more embodiments, note database 116 may include inputted or calculated information and datum related to note data 112. In some embodiments, a datum history may be stored in note database 116. As a non-limiting example, the datum history may include real-time and/or previous inputted data related to note data 112. As a non-limiting example, note database 116 may include instructions from a user, who may be an expert user, a past user in embodiments disclosed herein, or the like, where the instructions may include examples of the data related to note data 112.

With continued reference to FIG. 1, in some embodiments, processor 104 may be communicatively connected with note database 116. For example, and without limitation, in some cases, note database 116 may be local to processor 104. In another example, and without limitation, note database 116 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connect directly, dynamically, and non-hierarchically to as many other computing devices as possible. A "network topology" as used in this disclosure is an arrangement of elements of a communication network. The network may use an immutable sequential listing to securely store note database 116. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, note database 116 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described in this disclosure. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, memory 108 contains instructions configuring processor 104 to determine a plurality of operational language elements 124 from plurality of sets of note data 112. For the purposes of this disclosure, an "operational language element" is an element of word or syntax that is related to a health condition of a patient. In some embodiments, operational language element 124 may include a word, sentence, phrase, or the like. In some embodiments, operational language element 124 may be stored in element database 128. In some embodiments, processor 104 may retrieve operational language element 124 from element database 128. In some embodiments, user may manually input operational language element 124 or manually determine operational language element 124 from plurality sets of note data 112.

With continued reference to FIG. 1, operational language element 124 may include an unmet need language element 126. For the purposes of this disclosure, an "unmet need language element" is an element of word or syntax that is related to deficiency in existing services or products that does not address the specific requirements, desires, or expectations of a subject or user. As a non-limiting example, unmet need language element 126 may include a name of disease or health condition that needs to be addressed. As another non-limiting example, unmet need language element 126 may include a name of technical problems. For example, and without limitation, unmet need language element 126 may include cancer, stage 4 lung adenocarcinoma with leptomeningeal carcinomatosis, tracheomalacia, aneurysm, or the like. In a non-limiting example, unmet need language element 126 may include a name of disease or health condition that has been failed to be treated by clinicians.

With continued reference to FIG. 1, in some embodiments, operational language elements 124 may include a failed element control language element. For the purposes of this disclosure, a "failed element control language element" is an element of word or syntax that is related to a solution or treatment previously used provided to a subject that does not address the specific requirements, desires, or expectations of the subject or a user. As a non-limiting example, failed element control language element may include previously provided medical treatments, therapies, service, solution and the like that has been failed to overcome or solve unmet needs (e.g., unmet need language element 126). In some embodiments, operational language elements 124 may include a sentiment language element. For the purposes of this disclosure, a "sentiment language element" is an element of word or syntax that is related to a user's thoughts on treatability or solvability of an unmet need of a user. As a non-limiting example, sentiment language element may include 'difficult to treat,' 'irremediable,' 'incurable,' 'untreatable,' 'treatable,' and the like. In some embodiments, operational language elements 124 may include a sentiment strength language element. For the purposes of this disclosure, a "sentiment strength language element" is an element of word or syntax that is related to an intensity or frequency of user's thoughts related to an unmet need of a user. For example, and without limitation, sentiment strength language element may include 'often,' "frustrating,''dominative problem,' and the like. In some embodiments, operational language elements 124 may include an identifier language element. For the purposes of this disclosure, a "identifier language element" is an element of word or syntax that has a unique identifier of a user or user's note. For the purposes of this disclosure, a "unique identifier" is an identifier that is unique for an object among others. As a non-limiting example, unique identifier may include a universal product code (barcode), radio-frequency identification (RFID), cryptographic hashes, primary key, a unique sequencing of alpha-numeric symbols, or anything of the like that can be used to identify patient or user's note (e.g., note data 112). As a non-limiting example, identifier language element may include patient identifier language element that can identify a specific patient. As another non-limiting example, identifier language element may include note identifier language element that can identify a specific user's note (e.g., note data 112). In some embodiments, operational language elements 124 may include an element control language element. For the purposes of this disclosure, an "element control language element" is an element of word or syntax that is related to a proposed solution or treatment. In a non-limiting example, element control language element may include a proposed solution to a disease. A proposed solution is a suggested solution stated by health care workers in patient notes. As a non-limiting example, element control language element may include 'may be amendable to pipeline therapies,' 'does not have to control the cancer,' 'cystectomy with immunotherapy,' or the like. As another non-limiting example, operational language element 124 may include frequency of symptoms, additional information, physician opinion, and the like.

With continued reference to FIG. 1, in some embodiments, processor 104 may determine operational language element 124 using Bidirectional Encoder Representations from Transformers (BERT). In an embodiment, BERT may implement a transformer architecture having an "attention mechanism" configured to dynamically determine and assign weight e.g., importance of different token such as e.g., operational language elements 124 in note data 112. Exemplary attention mechanism may include, without limitation, generalized attention self-attention, multi-head attention, additive attention, global attention, and the like. In some cases, transformer architecture may be implemented as an encoder-decoder structure having an encoder configured to map an input sequence (e.g., note data 112) to a higher dimensional space i.e., a sequence of continuous representations, and a decoder configured to transform output of the encoder into a final output sequence (e.g., operational language element 124). In other cases, transformer architecture may include only an encoder stack. As a non-limiting example, BERT may include a plurality of layers each contains one or more sub-layers, wherein a first sub-layer may include a multi-head self-attention mechanism, and a second sub-layer may include a position-wise fully connected feed-forward network. In some cases, plurality of layers may be identical. In some cases, multi-head self-attention mechanism may configure BERT to focus on different parts of the input sequence when predicting operational language elements 124; for instance, and without limitation, self-attention mechanism may be described by an attention function:

$$\text{Attention}(Q, K, V) = \text{softmax}\left(\frac{QK^T}{\sqrt{d_k}}\right)V$$

Where Q, K, and V represent a set of queries, keys, and values matrices respectively, and $d_k$ is the dimensionality of the keys. In a non-limiting embodiment, set of queries Q may include note data 112, set of keys K may include keywords, and set of values may include a plurality of attention scores correlated to set of keys K computed using Q and V. In some cases, position-wise fully connected feed-forward network within second sub-layer of each layer may apply a linear transformation to each position separately and identically, for example, and without limitation, position-wise fully connected feed-forward network may be configured to process the output of the attention mechanism according to equation FFN(x)=max(0, xW$_1$+b$_1$) W$_2$+b$_2$, where W$_1$, W$_2$, b$_1$, and b$_2$ are parameters of the feed-forward and x is the input to the feed-forward network. In other words, second sub-layer may include two convolutions with a kernel size 1 and a ReLu activation in between.

With continued reference to FIG. 1, in one or more embodiments, BERT's input representation may combine a plurality of embeddings of tokens, segments, and/or positions. In some cases, each token may be processed, for example and without limitation, through a WordPiece tokenization. Output of BERT may include a fixed-length vector that represents the input token's contextual relationships that suitable for downstream tasks, such as, without limitation, sentiment analysis, question answering, named entity recognition (NER), determining keywords, and the like. In some cases, implementing BERT for determining operational language element 124 may include pre-training (bidirectionally) which involves one or more unsupervised tasks; for instance, and without limitation, processor 104 may be configured to execute a Masked Language Model (MLM) and a Next Sentence Prediction (NSP). In a non-limiting example, at least a portion of keywords or phrases in each sentence may be randomly masked, and the model may learn to predict masked note data 112 based on the context. NSP may train the model to predict, for example, and without limitation, whether two given keywords logically follow each other. Additionally, BERT may be fine-tuned for determining operational language element 124 to adapt pre-trained representations. In some cases, fine-tuning BERT may include iteratively training BERT's parameters on training data with minimal adjustments required from the pre-trained model as described above; for instance, and without limitation, a loss function used for fine-turning may be represented as:

$$L = -\log\left(\frac{e^{s(correct)}}{\sum_j e^{s(j)}}\right)$$

Wherein L is the loss, s(correct) is the score of the correct label, and s(j) is the score of each possible label. Processor 104 may fine-tune BERT on task-specific data to improve the model performance. It should be noted that other exemplary downstream tasks e.g., sentiment analysis, question answering, named entity recognition (NER), among others may be adapted and optimized based on the apparatus 100 and methods described in this disclosure. As a person skilled in the art, upon reviewing the entirety of this disclosure, will be well versed in the model architectures, including multi-head self-attention mechanism and position-wise fully connected feed-forward network as described herein.

With continued reference to FIG. 1, in some embodiments, processor 104 may analyze note data 112 to find operational language element 124 using optical character recognition (OCR). For the purposes of this disclosure, "optical character recognition" is a technology that enables the recognition and conversion of printed or written text into machine-encoded text. In some cases, processor 104 may be configured to recognize a keyword using the OCR to find operational language element 124. As used in this disclosure, a "keyword" is an element of word or syntax used to identify and/or match elements to each other. In some cases, processor 104 may transcribe much or even substantially all note data 112.

With continued reference to FIG. 1, in some embodiments, optical character recognition or optical character reader (OCR) may include automatic conversion of images of written (e.g., handwritten or printed text [e.g., note data 112]) into machine-encoded text. In some cases, recognition of a keyword from note data 112 may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of note data 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to note data 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 4. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes note data 112. Since the adaptive classifier may have learned something useful a little too late to recognize characters on the first pass, a second pass may be run over the note data 112. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, processor 104 may use a language processing module to find at least an operational language elements 124 (e.g., keyword). The language processing module may be configured to extract, from the one or more documents (e.g., note data), one or more words (e.g., operational language element 124). One or more words may include, without limitation, strings of one or more characters, including without limitation any sequence or sequences of letters, numbers, punctuation, diacritic marks, medical terms, abbreviations, engineering symbols, chemical symbols and formulas, spaces, whitespace, and other symbols, including any symbols as described above. Textual data (e.g., note data 112) may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents (e.g., note data 112) to generate associations between language elements in a language processing module may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, processor 104 may automatically obtain the document using such an identifier, for instance by submitting a request to a database or compendium of documents such as JSTOR as provided by Ithaka Harbors, Inc. of New York.

With continued reference to FIG. 1, in some embodiments, processor 104 may be configured to determine an element sentiment 136 of operational language element 124. For the purposes of this disclosure, an "element sentiment" is a datum that includes expressed emotional tone, attitude, subjective feelings, or medical/professional opinion. In some embodiments, element sentiment 136 may include positive sentiment, negative sentiment, neutral, and the like. As a non-limiting example, positive sentiment may include 'treatable,' 'medication is effective,' 'optimistic,' or the like. For the purposes of this disclosure, a "negative sentiment" is the expression of negative emotions, opinions, or attitudes in text. As another non-limiting example, negative sentiment may include 'untreatable,' 'severe,' 'difficult to solve,' or the like. In some embodiments, element sentiment 136 of operational language element 124 may be stored in element database 128. In some embodiments, processor 104 may retrieve element sentiment 136 of operational language element 124 from element database 128. In some embodiments, user may manually input element sentiment 136 or manually determine element sentiment 136 of operational language element 124.

With continued reference to FIG. 1, in some embodiments, processor 104 may determine element sentiment 136 of operational language element 124 using pre-defined lists of words, phrases or keywords with associated element sentiment 136 score. As a non-limiting example, a keyword 'difficult' might have a negative score, while "treatable" has a positive score. In some embodiments, the pre-define lists may be stored in element database 128. In some embodiments, processor 104 may retrieve the pre-define lists from element database 128. In some embodiments, user may manually input the pre-define lists.

With continued reference to FIG. 1, in another embodiment, processor 104 may determine element sentiment 136 of operational language element 124 using a machine-learning module. The machine-learning module is further described in detail below. In some embodiments, processor 104 may be configured to generate sentiment training data. In a non-limiting example, sentiment training data may include correlations between exemplary operational language elements and exemplary element sentiments 136. In some embodiments, sentiment training data may be stored in element database 128. In some embodiments, sentiment training data may be received from one or more users, element database 128, external computing devices, and/or previous iterations of processing. As a non-limiting example, sentiment training data may include instructions from a user, who may be an expert user, a past user in embodiments disclosed herein, or the like, which may be stored in memory and/or stored in element database 128, where the instructions may include labeling of training examples. In some embodiments, sentiment training data may be updated iteratively using a feedback loop. As a non-limiting example, processor 104 may update sentiment training data iteratively through a feedback loop as a function of note data 112, operational language element 124, output of language processing module, or the like. In some embodiments, processor 104 may be configured to generate sentiment machine-learning model. In a non-limiting example, generating sentiment machine-learning model may include training, retraining, or fine-tuning sentiment machine-learning model using sentiment training data or updated sentiment training data. In some embodiments, processor 104 may be configured to determine element sentiment 136 using sentiment machine-learning model (i.e. trained or updated sentiment machine-learning model). In some embodiments, patient or note data 112 may be classified to a patient cohort using a cohort classifier. Cohort classifier may be consistent with any classifier discussed in this disclosure. Cohort classifier may be trained on cohort training data, wherein the cohort training data may include exemplary note data correlated to patient cohorts. In some embodiments, a patient may be classified to a patient cohort and processor 104 may determine element sentiment 136 based on the patient cohort using a machine-learning module and the resulting output may be used to update sentiment training data. As a non-limiting example, patient that have chronical disease may have higher percentage or probability to have negative sentiment for operational language element 124 compared to patient that have no chronical disease. In some embodiments, generating training data and training machine-learning models may be simultaneous.

With continued reference to FIG. 1, in some embodiments, processor 104 may generate an element database 128 including an element data structure 132 as a function of operational language element 124. For the purposes of this disclosure, an "element database" is a data store that stores data related to operational language elements. As a non-limiting example, element database 128 may store operational language elements 124, element sentiment 136, element groups 140, element control datum 144, and the like. As another non-limiting example, processor 104 may store a failed element control language element, sentiment language element, unmet need language element, identifier language element, and the like in element database 128. In some embodiments, processor 104 may generate element data structure 132 as a function of operational language element 124. For the purposes of this disclosure, an "element data structure" is a structured organization of data related to operational language elements. In some embodiments, element data structure 132 or any data structure may include a text, image, graph, table, decision tree, or the like.

In some embodiments, element data structure 132 may provide a summarization, representation, or otherwise abstraction of operational language elements 124 and any related data. As a non-limiting example, element data structure 132 may include a table that have a plurality of operational language elements 124 organized in rows and columns as a function of element groups 140. As another non-limiting example, element data structure 132 may include a table that organizes a failed element control language element, sentiment language element, unmet need language element, identifier language element, and the like according to different patients or different user's note.

With continued reference to FIG. 1, memory 108 contains instructions configuring processor 104 to classify operational language element 124 into one or more element groups 140. For the purposes of this disclosure, an "element group" is a set of operational language elements based on shared characteristics, properties, or features. As a non-limiting example, element groups 140 may include a name of disease or health condition group. For example, and without limitation, element groups 140 may include cancer, stage 4 lung adenocarcinoma with leptomeningeal carcinomatosis, tracheomalacia, aneurysm group, or the like. As another non-limiting example, element groups 140 may include treatability, previously used treatment, frequency of symptoms, degree of disease or health condition, additional information, proposed parameter control, physician opinion group, and the like. In some embodiments, element groups 140 may include negative and positive group. As a non-limiting example, processor 104 may classify operational language elements 124 that have negative sentiment into negative group. In some embodiments, element groups 140 may include patient identifier group, note identifier group, or the like. As a non-limiting example, processor 104 may classify patient identifier (e.g., patient identification number) into patient identifier group. In some embodiments, each element group 140 may include an element connection. For the purposes of this disclosure, an "element connection" is a relation between a plurality of operational language elements. As a non-limiting example, one element group 140 may have element connection with multiple element groups 140. For example, and without limitation, patient identifier group or name of disease group may have element connection with treatability group, frequency of symptoms group, degree of disease group, and the like. In some embodiments, element groups 140 may be stored in element database 128. In some embodiments, processor 104 may retrieve element groups 140 from element database 128. In some embodiments, user may manually input element groups 140 or manually determine element groups 140 for operational language elements 124.

With continued reference to FIG. 1, in some embodiments, processor 104 may classify operational language elements 124 to element groups 140 using a machine-learning module. some embodiments, processor 104 may be configured to generate group training data. In a non-limiting example, group training data may include correlations between exemplary operational language elements and exemplary element groups. In some embodiments, group training data may be stored in element database 128. In some embodiments, group training data may be received from one or more users, element database 128, external computing devices, and/or previous iterations of processing. As a non-limiting example, group training data may include instructions from a user, who may be an expert user, a past user in embodiments disclosed herein, or the like, which may be stored in memory and/or stored in element database 128, where the instructions may include labeling of training examples. In some embodiments, group training data may be updated iteratively using a feedback loop. As a non-limiting example, processor 104 may update group training data iteratively through a feedback loop as a function of note data 112, operational language element 124, output of language processing module, output of sentiment machine-learning model, or the like. In some embodiments, processor 104 may be configured to generate group classifier 148. In a non-limiting example, generating group classifier 148 may include training, retraining, or fine-tuning group classifier 148 using group training data or updated group training data. In some embodiments, processor 104 may be configured to classify operational language elements 124 to element groups 140 using group classifier 148 (i.e. trained or updated group classifier 148). In some embodiments, group classifier 148 may include supervised or unsupervised machine-learning process. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Continuing refer to FIG. 1, in some embodiments, processor 104 may classify a plurality of operational language elements 124 using a feature learning and/or clustering algorithm. A feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as biclustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids ci of centroids in set C. Unclassified data may be assigned to a cluster based on $argmin_{ci \ni c} dist(ci, x)^2$, where argmin includes argument of the minimum, ci includes a collection of centroids in a set C, and dist includes standard Euclidean distance. K-means clustering module may then recompute centroids by taking mean of all cluster data entries assigned to a centroid's cluster. This may be calculated based on $ci = 1/|Si| \Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between a elements to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only, and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, processor 104 may be configured to convert operational language element 124 to a scaled language element 152. For the purposes of this disclosure, a "scaled language element" is a standardized form of a keyword that has been modified or transformed to ensure consistency and uniformity across different variations. Processor 104 is configured to convert operational language element 124 to a scaled language element 152 as a function of one or more element groups 140. In a non-limiting example, if operational language elements 124 in a name of disease or health condition group includes 'coronary artery disease,' 'CAD,' and 'atherosclerotic heart disease,' then processor 104 may convert the operational language elements 124 to 'CAD' (e.g., scaled language element 152). In some embodiments, scaled language elements 152 may be stored in scaled database 156. In some embodiments, processor 104 may retrieve scaled language elements 152 from scaled database 156. In some embodiments, user may manually input scaled language elements 152 or manually determine scaled language elements 152 for operational language elements 124.

With continued reference to FIG. 1, in some embodiments, processor 104 may convert operational language elements 124 to scaled language elements 152 using a machine-learning module. some embodiments, processor 104 may be configured to generate scaling training data. In a non-limiting example, scaling training data may include correlations between exemplary operational language elements and exemplary scaled language elements. In some embodiments, scaling training data may be stored in element database 128. In some embodiments, scaling training data may be received from one or more users, element database 128, external computing devices, and/or previous iterations of processing. As a non-limiting example, scaling training data may include instructions from a user, who may be an expert user, a past user in embodiments disclosed herein, or the like, which may be stored in memory and/or stored in element database 128, where the instructions may include labeling of training examples. In some embodiments, scaling training data may be updated iteratively using a feedback loop. As a non-limiting example, processor 104 may update scaling training data iteratively through a feedback loop as a function of note data 112, operational language element 124, element group 140, output of language processing module, output of sentiment machine-learning model, output of group classifier, or the like. In some embodiments, processor 104 may be configured to generate scaling machine-learning model. In a non-limiting example, generating scaling machine-learning model may include training, retraining, or fine-tuning scaling machine-learning model using scaling training data or updated scaling training data. In some embodiments, processor 104 may be configured to convert operational language elements 124 to scaled language elements 152 using scaling machine-learning model (i.e. trained or updated scaling machine-learning model).

With continued reference to FIG. 1, in some embodiments, processor 104 may generate a scaled database 156. For the purposes of this disclosure, a "scaled database" is a data store that stores data related to scaled language elements. As a non-limiting example, element database 128 may store scaled language elements 152, scaling training data, and the like. In some embodiments, scaled database 156 may include a scaled data structure 160. In some embodiments, processor 104 may generate scaled data structure 160 as a function of scaled language elements 152. For the purposes of this disclosure, a "scaled data structure" is a structured organization of data related to scaled language elements. In some embodiments, scaled data structure 160 or any data structure may include a text, image, graph, table, decision tree, or the like. In some embodiments, scaled data structure 160 may provide a summarization, representation, or otherwise abstraction of scaled language elements 152 and any related data. As a non-limiting example, scaled data structure 160 may include a table that have a plurality of scaled language elements 152 organized in rows and columns as a function of element groups 140. In some embodiments, processor 104 may generate scaled data structure 160 or scaled database 156 as a function of scaled language element 152 and element data structure 132 of element database 128. As a non-limiting example, scaled data structure 160 may include a format or structure that is consistent with element data structure 132 but with operational language elements 124 converted to scaled language elements 152. In some embodiments, processor 104 may update scaled data structure 160 as element data structure 132 is updated.

With continued reference to FIG. 1, processor 104 may be configured to combine element metadata 164 with scaled language element 152. As used in the current disclosure, "element metadata" refers to descriptive information or attributes that provide context, structure, and meaning to language elements. Element metadata 164 can help in understanding and managing various aspects of data, such as its origin, content, format, quality, and usage. It can play a crucial role in organizing, searching, and interpreting data effectively. Element metadata 164 may include descriptive element metadata, structural element metadata, administrative element metadata, technical element metadata, provenance element metadata, usage element metadata, and the like. Element metadata 164 may be organized and managed through metadata schemas, standards, or frameworks. These provide guidelines and specifications for capturing, storing, and exchanging element metadata 164 in a consistent and structured manner. Common metadata standards include Dublin Core, Metadata Object Description Schema (MODS), and the Federal Geographic Data Committee (FGDC) metadata standard. In some cases, element metadata 164 may be associated with scaled language elements 152 or operational language elements 124. Element metadata 164 may provide additional descriptive information or attributes that are linked to operational language elements 124 or scaled language elements 152. For example, and without limitation, element metadata 164 may include a 'number of patients reported based on healthcare workers (HCW) stated disease or health condition,' 'total number of patients suffering from the disease or health condition,' 'relative time interval between the birth date and the index event of disease or health condition,' 'age, age group, and demographic characteristics of the patient at the time of the index mention of disease or health condition by health care worker (HCW),' 'effectiveness and availability of existing treatments,' 'impact on patient quality of life, symptoms, signs, and treatment outcomes,' 'diagnosis, treatments, and procedures details,' 'industry and medical subject domains of the disease or health condition,' 'group of HCW raising the claim and the domain that existing failed solutions belong to,' 'impact of disease or health condition including but not limited to significant impact, impactful, and trivial,' 'number of earlier reports in public literature of the disease or health condition,' and the like. In some embodiments, element metadata 164 may be stored in meta database 168. In some embodiments, processor 104 may retrieve element metadata 164 from meta database 168. In some embodiments, user may manually input element metadata 164.

With continued reference to FIG. 1, in some embodiments, combining element metadata 164 to scaled language element 152 may include retrieving, from a plurality of note data 112, element metadata 164 relating to the plurality of note data 112, wherein the element metadata 164 may include author data, determining an author count as a function of the author data and storing the author count in a note database 116. In some embodiments, element metadata 164 may be retrieved from note data 112 by analyzing note data 112 to find keywords as described in this disclosure. For example, and without limitation, note data 112 can be analyzed using LLM, language processing module, and the like. For the purposes of this disclosure, "author data" is data related to an author of a plurality of note data. As a non-limiting example, author may include clinician, health care worker, medical professional, and the like. As a non-limiting example, author data may include demographic of an author, medical experience, unique identifier of an author, and the like. For the purposes of this disclosure, an "author count" is a number of distinct authors associated with a plurality of sets of note data. As a non-limiting example, if three authors reported note data 112 related to a specific unmet need language element 126 of operational language element 124, author count may be three.

With continued reference to FIG. 1, in some embodiments, combining element metadata 164 to scaled language element 152 may include querying a meta database 168 using scaled language element 152 to retrieve element metadata 164. For the purposes of this disclosure, a "meta database" is a data store configured to store data associated with element metadata. Meta database 168 disclosed herein may be consistent with any database described in this disclosure. In a non-limiting example, processor 104 may query meta database 168 using scaled language element 152 to retrieve element metadata 164 that is specifically related to the scaled language element 152 so that the retrieved element metadata 164 can be combined to scaled language element 152.

With continued reference to FIG. 1, memory 108 contains instructions configuring processor 104 to generate a note data structure 172 as a function of combination of element metadata 164 and scaled operational language element 124. For the purposes of this disclosure, a "note data structure" is a structured organization of data related to note data. In some embodiments, note data structure or any data structure may include a text, image, graph, table, or the like. In some embodiments, note data structure 172 or any data structure may provide a summarization, representation, or otherwise abstraction of note data 112 and any related data. In a non-limiting example, note data structure 172 may include a comprehensive report on note data 112. In another non-limiting example, note data structure 172 may include a list of disease or health condition names and related element control datum 144. In another non-limiting example, note data structure 172 may include a list of note identifier of note data 112 related to element control datum 144. For the purposes of this disclosure, a "note identifier" is an identifier that is unique for one document among others. In some embodiments, note data structure 172 may be stored in note database 116. In some embodiments, processor 104 may retrieve note data structure 172 from note database 116.

With continued reference to FIG. 1, in some embodiments, generating note data structure 172 may include generating note data structure 172 as a function of scaled data structure 160 of scaled database 156. As a non-limiting example, processor 104 may generate note data structure 172 based on scaled data structure 160, while note data structure 172 may include scaled language elements 152 combined with element metadata 164, element control datum 144, and the like. In some embodiments, processor 104 may update note data structure 172 as scaled data structure 160 is updated.

With continued reference to FIG. 1, in some embodiments, note data structure 172 or any data structure described herein (e.g., element data structure 132, scaled data structure 160, or the like) may include a matrix. As used in this disclosure, a "matrix" is a rectangular array or table of numbers, symbols, expressions, vectors, and/or representations arranged in rows and columns. For instance, and without limitation, matrix may include rows and/or columns comprised of vectors representing operational language elements 124, scaled language elements 152, scaled language elements 152 combined with element metadata 164, or the like, where each row and/or column is a vector representing a distinct operational language elements 124, scaled language elements 152, scaled language elements 152 combined with element metadata 164, or the like; operational language elements 124, scaled language elements 152, scaled language elements 152 combined with element metadata 164, or the like, represented by vectors in matrix may include all disease or health condition names as described above as the disease or health condition names may be generated by converting operational language elements 124 to scaled language elements 152, including without limitation, element control datum 144 as described above. As a non-limiting example matrix may include one or more element groups 140.

With continued reference to FIG. 1, matrix may be generated by performing a singular value decomposition function. As used in this disclosure a "singular value decomposition function" is a factorization of a real and/or complex matrix that generalizes the eigen decomposition of a square normal matrix to any matrix of m rows and n columns via an extension of the polar decomposition. For example, and without limitation singular value decomposition function may decompose a first matrix, A, comprised of m rows and n columns to three other matrices, U, S, V, wherein matrix U, represents left singular vectors consisting of an orthogonal matrix of m rows and m columns, matrix S represents a singular value diagonal matrix of m rows and n columns, and matrix $V^T$ represents right singular vectors consisting of an orthogonal matrix of n rows and n columns according to the function:

$$A_{m \times n} = U_{m \times m} S_{m \times n} V_{n \times n}$$

singular value decomposition function may find eigenvalues and eigenvectors of $AA^T$ and $A^TA$. The eigenvectors of $A^TA$ may include the columns of $V^T$, wherein the eigenvectors of $AA^T$ may include the columns of U. The singular values in S may be determined as a function of the square roots of eigenvalues $AA^T$ or $A^TA$, wherein the singular values are the diagonal entries of the S matrix and are arranged in descending order. Singular value decomposition may be performed such that a generalized inverse of a non-full rank matrix may be generated.

With continued reference to FIG. 1, a "vector" as defined in this disclosure is a data structure that represents one or more a quantitative values and/or measures language elements. Such vector and/or embedding may include and/or represent an element of a vector space; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. A vector may be represented as an n-tuple of values, where n is one or more values, as described in further detail below; a vector may alternatively or additionally be represented as an element of a vector space, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent, for instance as measured using cosine similarity as computed using a dot product of two vectors; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l = \sqrt{\Sigma_{i=0}^{n} a_i^2}$, where ai is attribute number i of the vector. Scaling and/or normalization may function to make vector comparison independent of absolute quantities of attributes, while preserving any dependency on similarity of attributes. A two-dimensional subspace of a vector space may be defined by any two orthogonal vectors contained within the vector space. Two-dimensional subspace of a vector space may be defined by any two orthogonal and/or linearly independent vectors contained within the vector space; similarly, an n-dimensional space may be defined by n vectors that are linearly independent and/or orthogonal contained within a vector space. A vector's "norm' is a scalar value, denoted $\|a\|$ indicating the vector's length or size, and may be defined, as a non-limiting example, according to a Euclidean norm for an n-dimensional vector a as:

$$\|a\| = \sqrt{\sum_{i=0}^{n} a_i^2}$$

In an embodiment, and with continued reference to FIG. 1, each operational language elements 124, scaled language elements 152, scaled language elements 152 combined with element metadata 164, or the like (e.g., language elements) may be represented by a dimension of a vector space; as a non-limiting example, each element of a vector may include a number representing an enumeration of co-occurrences of a first language element represented by the vector with second language element. Alternatively, or additionally, dimensions of vector space may not represent distinct operational language elements 124, scaled language elements 152, scaled language elements 152 combined with element metadata 164, or the like, in which case elements of a vector representing a first language element may have numerical values that together represent a geometrical relationship to a vector representing a second language element, wherein the geometrical relationship represents and/or approximates a semantic relationship between the first language element and the second language element. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below.

With continued reference to FIG. 1, any vectors as described herein may be scaled, such that each vector represents each attribute along an equivalent scale of values. In an embodiment associating language elements (e.g., operational language elements 124) to one another as described above may include computing a degree of vector similarity between a vector representing each language elements and a vector representing another language elements; vector similarity may be measured according to any norm for proximity and/or similarity of two vectors, including without limitation cosine similarity. As used in this disclosure "cosine similarity" is a measure of similarity between two-non-zero vectors of a vector space, wherein determining the similarity includes determining the cosine of the angle between the two vectors. Cosine similarity may be computed as a function of using a dot product of the two vectors divided by the lengths of the two vectors, or the dot product of two normalized vectors. For instance, and without limitation, a cosine of 0° is 1, wherein it is less than 1 for any angle in the interval (0,π) radians. Cosine similarity may be a judgment of orientation and not magnitude, wherein two vectors with the same orientation have a cosine similarity of 1, two vectors oriented at 90° relative to each other have a similarity of 0, and two vectors diametrically opposed have a similarity of −1, independent of their magnitude. As a non-limiting example, vectors may be considered similar if parallel to one another. As a further non-limiting example, vectors may be considered dissimilar if orthogonal to one another. As a further non-limiting example, vectors may be considered uncorrelated if opposite to one another. Additionally, or alternatively, degree of similarity may include any other geometric measure of distance between vectors.

With continued reference to FIG. 1, in some embodiments, processor 104 may generate note data structure using a large language model (LLM) or natural language processing (NLP). A "large language model," as used herein, is a deep learning algorithm that can recognize, summarize, translate, predict and/or generate text and other content based on knowledge gained from massive datasets. LLM may be a type of generative artificial intelligence (AI). LLMs may be trained on large sets of data; for example, training sets may include greater than 1 million words. Training sets may be drawn from diverse sets of data such as, as non-limiting examples, novels, blog posts, articles, emails, and the like. Training sets may include a variety of subject matters, such as, as nonlimiting examples, medical tests, romantic ballads, beat poetry, emails, advertising documents, newspaper articles, and the like. LLMs, in some embodiments, may include GPT, GPT-2, GPT-3, and other language processing models. LLM may be used to augment the text in an article based on a prompt. Training data may correlate elements of a dictionary related to linguistics, as described above, to a prompt. LLM may include a text prediction based algorithm configured to receive an article and apply a probability distribution to the words already typed in a sentence to work out the most likely word to come next in augmented articles. For example, if the words already typed are "Nice to meet," then it is highly likely that the word "you" will come next. LLM may output such predictions by ranking words by likelihood or a prompt parameter. For the example given above, the LLM may score "you" as the most likely, "your" as the next most likely, "his" or "her" next, and the like.

Still referring to FIG. 1, LLM may include an attention mechanism, utilizing a transformer as described further below. Attention mechanism may be a part of a neural architecture that enables a system to dynamically highlight relevant features of the input data. In natural language processing this may be a sequence of textual elements. It may be applied directly to the raw input or to its higher-level representation. An attention mechanism may be an improvement to the limitation of the Encoder-Decoder model which encodes the input sequence to one fixed length vector from which to decode the output at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation. In some embodiments, LLM may include encoder-decoder model incorporating an attention mechanism.

Still referring to FIG. 1, LLM may include a transformer architecture. In some embodiments, encoder component of LLM may include transformer architecture. A "transformer architecture," for the purposes of this disclosure is a neural network architecture that uses self-attention and positional encoding. Transformer architecture may be designed to process sequential input data, such as natural language, with applications towards tasks such as translation and text summarization. Transformer architecture may process the entire input all at once. "Positional encoding," for the purposes of this disclosure, refers to a data processing technique that encodes the location or position of an entity in a sequence. In some embodiments, each position in the sequence may be assigned a unique representation. In some embodiments, positional encoding may include mapping each position in the sequence to a position vector. In some embodiments, trigonometric functions, such as sine and cosine, may be used to determine the values in the position vector. In some embodiments, position vectors for a plurality of positions in a sequence may be assembled into a position matrix, wherein each row of position matrix may represent a position in the sequence.

With continued reference to FIG. 1, an attention mechanism may represent an improvement over a limitation of the Encoder-Decoder model. The encoder-decider model encodes the input sequence to one fixed length vector from which the output is decoded at each time step. This issue may be seen as a problem when decoding long sequences because it may make it difficult for the neural network to cope with long sentences, such as those that are longer than the sentences in the training corpus. Applying an attention mechanism, LLM may predict the next word by searching for a set of position in a source sentence where the most relevant information is concentrated. LLM may then predict the next word based on context vectors associated with these source positions and all the previous generated target words, such as textual data of a dictionary correlated to a prompt in a training data set. A "context vector," as used herein, are fixed-length vector representations useful for document retrieval and word sense disambiguation.

Still referring to FIG. 1, an attention mechanism may include generalized attention self-attention, multi-head attention, additive attention, global attention, and the like. In generalized attention, when a sequence of words or an image is fed to LLM, it may verify each element of the input sequence and compare it against the output sequence. Each iteration may involve the mechanism's encoder capturing the input sequence and comparing it with each element of the decoder's sequence. From the comparison scores, the mechanism may then select the words or parts of the image that it needs to pay attention to. In self-attention, LLM may pick up particular parts at different positions in the input sequence and over time compute an initial composition of the output sequence. In multi-head attention, LLM may include a transformer model of an attention mechanism. Attention mechanisms, as described above, may provide context for any position in the input sequence. For example, if the input data is a natural language sentence, the transformer does not have to process one word at a time. In multi-head attention, computations by LLM may be repeated over several iterations, each computation may form parallel layers known as attention heads. Each separate head may independently pass the input sequence and corresponding output sequence element through a separate head. A final attention score may be produced by combining attention scores at each head so that every nuance of the input sequence is taken into consideration. In additive attention (Bahdanau attention mechanism), LLM may make use of attention alignment scores based on a number of factors. These alignment scores may be calculated at different points in a neural network. Source or input sequence words are correlated with target or output sequence words but not to an exact degree. This correlation may take into account all hidden states and the final alignment score is the summation of the matrix of alignment scores. In global attention (Luong mechanism), in situations where neural machine translations are required, LLM may either attend to all source words or predict the target sentence, thereby attending to a smaller subset of words.

With continued reference to FIG. 1, multi-headed attention in encoder may apply a specific attention mechanism called self-attention. Self-attention allows the models to associate each word in the input, to other words. So, as a non-limiting example, the LLM may learn to associate the word "you," with "how" and "are". It's also possible that LLM learns that words structured in this pattern are typically a question and to respond appropriately. In some embodiments, to achieve self-attention, input may be fed into three distinct fully connected layers to create query, key, and value vectors. The query, key, and value vectors may be fed through a linear layer; then, the query and key vectors may be multiplies using dot product matrix multiplication in order to produce a score matrix. The score matrix may determine the amount of focus for a word should be put on other words (thus, each word may be a score that corresponds to other words in the time-step). The values in score matrix may be scaled down. As a non-limiting example, score matrix may be divided by the square root of the dimension of the query and key vectors. In some embodiments, the softmax of the scaled scores in score matrix may be taken. The output of this softmax function may be called the attention weights. Attention weights may be multiplied by your value vector to obtain an output vector. The output vector may then be fed through a final linear layer.

With continued reference to FIG. 1, in order to use self-attention in a multi-headed attention computation, query, key, and value may be split into N vectors before applying self-attention. Each self-attention process may be called a "head." Each head may produce an output vector and each output vector from each head may be concatenated into a single vector. This single vector may then be fed through the final linear layer discussed above. In theory, each head can learn something different from the input, therefore giving the encoder model more representation power.

With continued reference to FIG. 1, encoder of transformer may include a residual connection. Residual connection may include adding the output from multi-headed attention to the positional input embedding. In some embodiments, the output from residual connection may go through a layer normalization. In some embodiments, the normalized residual output may be projected through a pointwise feed-forward network for further processing. The pointwise feed-forward network may include a couple of linear layers with a ReLU activation in between. The output may then be added to the input of the pointwise feed-forward network and further normalized.

With continued reference to FIG. 1, transformer architecture may include a decoder. Decoder may a multi-headed attention layer, a pointwise feed-forward layer, one or more residual connections, and layer normalization (particularly after each sub-layer), as discussed in more detail above. In some embodiments, decoder may include two multi-headed attention layers. In some embodiments, decoder may be autoregressive. For the purposes of this disclosure, "autoregressive" means that the decoder takes in a list of previous outputs as inputs along with encoder outputs containing attention information from the input.

With continued reference to FIG. 1, in some embodiments, input to decoder may go through an embedding layer and positional encoding layer in order to obtain positional embeddings. Decoder may include a first multi-headed attention layer, wherein the first multi-headed attention layer may receive positional embeddings.

With continued reference to FIG. 1, first multi-headed attention layer may be configured to not condition to future tokens. As a non-limiting example, when computing attention scores on the word "am," decoder should not have access to the word "fine" in "I am fine," because that word is a future word that was generated after. The word "am" should only have access to itself and the words before it. In some embodiments, this may be accomplished by implementing a look-ahead mask. Look ahead mask is a matrix of the same dimensions as the scaled attention score matrix that is filled with "0s" and negative infinities. For example, the top right triangle portion of look-ahead mask may be filed with negative infinities. Look-ahead mask may be added to scaled attention score matrix to obtain a masked score matrix. Masked score matrix may include scaled attention scores in the lower-left triangle of the matrix and negative infinities in the upper-right triangle of the matrix. Then, when the SoftMax of this matrix is taken, the negative infinities will be zeroed out; this leaves "zero" attention scores for "future tokens".

With continued reference to FIG. 1, second multi-headed attention layer may use encoder outputs as queries and keys and the outputs from the first multi-headed attention layer as values. This process matches the encoder's input to the decoder's input, allowing the decoder to decide which encoder input is relevant to put a focus on. The output from second multi-headed attention layer may be fed through a pointwise feedforward layer for further processing.

With continued reference to FIG. 1, the output of the pointwise feedforward layer may be fed through a final linear layer. This final linear layer may act as a classifier. This classifier may be as big as the number of classes that you have. For example, if you have 10,000 classes for 10,000 words, the output of that classes will be of size 10,000. The output of this classifier may be fed into a SoftMax layer which may serve to produce probability scores between zero and one. The index may be taken of the highest probability score in order to determine a predicted word.

With continued reference to FIG. 1, decoder may take this output and add it to the decoder inputs. Decoder may continue decoding until a token is predicted. Decoder may stop decoding once it predicts an end token. In some embodiment, decoder may be stacked N layers high, with each layer taking in inputs from the encoder and layers before it. Stacking layers may allow LLM to learn to extract and focus on different combinations of attention from its attention heads.

With continued reference to FIG. 1, in some embodiments, LLM may be specifically trained using large language model (LLM) training data. In some embodiments, LLM training data may include correlations between exemplary operational language elements, exemplary scaled language elements, exemplary element metadata, exemplary scaled language elements combined with exemplary element metadata, and/or exemplary note data structure. In some embodiments, LLM training data may include a set of data that is in user's voice, email, or the like to mimic them. In some embodiments, LLM training data may be consistent with any training data described in the entirety of this disclosure. In some embodiments, LLM training data may be received from one or more users, note database 116, external computing devices, and/or previous iterations of processing. As a non-limiting example, LLM training data may include instructions from a user, who may be an expert user, a past user in embodiments disclosed herein, or the like, which may be stored in memory and/or stored in note database 116, where the instructions may include labeling of training examples. In some embodiments, LLM training data may be updated iteratively through a feedback loop. As a non-limiting example, LLM training data may be updated iteratively through a feedback loop as a function of newly collected note data 112, operational language elements 124, scaled language elements 152, element metadata 164, and the like. In some embodiments, processor 104 may be configured to generate LLM. In a non-limiting example, generating LLM may include training, retraining, or fine-tuning LLM using LLM training data or updated LLM training data. In some embodiments, processor 104 may be configured to generate note data structure 172 using LLM (i.e. trained or updated LLM). In a non-limiting example, LLM may find relevant sentence, phrase, paragraph, or excerpts from a plurality of sets of note data 112 and parse the portion of note data 112 to identify a plurality of operational language elements 124. In a non-limiting example, NLP may include tokenization, morphological analysis, syntactic analysis, semantic analysis, named entity recognition (NER), sentiment analysis, and the like to analyze note data 112. This may determine a plurality of operational language elements 124, element sentiment, failed element control language element, sentiment language element, identifier language element, unmet need language element, sentiment strength language element, element control language element, and the like. In some embodiments, NLP may generate element control datum 144 based on the analysis.

With continued reference to FIG. 1, in some embodiments, processor 104 may be configured to implement retrieval-augmented generation (RAG). For the purposes of this disclosure, "retrieval-augmented generation" is a technique in natural language processing that combines retrieval-based methods with generative models. In some embodiments, the use of RAG may improve the quality and accuracy of generated text. In some embodiments, processor 104 that implemented RAG may query or retrieve any data needed from various databases described in this disclosure; element database 128, note database 116, scaled database 156, meta database, and the like. Then, processor 104 may feed the retrieved information into generative model (e.g., LLM, and the like), providing it with context and factual grounding and the generative model may use the context to generate a response or complete a text generation task. (e.g., generating a note data structure, element control datum 144, and the like).

With continued reference to FIG. 1, in some embodiments, processor 104 is configured to generate an element control datum 144 as a function of unmet need language element 126 of plurality of operational language elements 124. For the purposes of this disclosure, an "element control datum" is a single piece of information or an individual data point that is part of a solution that can change a sentiment of language elements. As a non-limiting example, element control datum 144 may include medical treatments, therapies, medications, life style changes, solutions, or the like that can improve health condition of a patient. In some embodiments, operational language element 124 may include element control datum 144 (e.g., element control language element). In a non-limiting example, note data 112 may include operational language element 124 that suggests a proposed solution as a treatment for disease or health condition of a patient and processor 104 may use the operational language element 124 (e.g., element control language element) as element control datum 144. Proposed solutions may include, for example, solutions stated by health care workers in a patient's notes. Proposed solutions are further discussed and shown in FIGS. 2C and 7B. For example, and without limitation, processor 104 may retrieve element control language element from element database 128 to use it as element control datum 144. In some embodiments, processor 104 may generate element control datum 144 as a function of element metadata 164. In a non-limiting example, element metadata 164 may include metadata related to existing solutions for disease or health condition and processor 104 may use the existing solutions as element control datum 144. In some embodiments, processor 104 may be configured to retrieve element control datum 144 from an external data source. As a non-limiting example, processor 104 may retrieve element control datum 144 from external data source using an unmet need language element 126. For example, and without limitation, processor 104 may query external data source using unmet need language element 126 to retrieve solutions or treatments (e.g., element control datum 144) for the unmet need language element 126. For the purposes of this disclosure, an "external data source" is any database, system, or repository of information that originates outside of an apparatus 100. As a non-limiting example, external data source may include APIs, external database (e.g., EHR database, clinical trials database, health insurance database, pharmaceutical database, and the like), medical literature and research publications, or survey retrieved using web crawler, and the like. In a non-limiting example, element control datum 144 may be extracted from external data source as a solution for disease (e.g., element control datum 144) can be populated based on existing medical knowledge.

With continued reference to FIG. 1, in some embodiments, element control datum 144 may include a no-answer element control datum. For the purposes of this disclosure, a "no-answer element control datum" is a single piece of information or an individual data point that is a part of solution that is not available for a disease or health condition. In some embodiments, processor 104 may generate no-answer element control datum when there is no solution able to be populated for a disease as many disease have no existing solutions yet. As a non-limiting example, no-answer element control datum may include 'no answer,' or 'N/A,' indicating that there is no treatment or cure that is available for a specific disease or health condition. In some embodiments, element control datum 144 may be stored in note database 116. In some embodiments, element control datum 144 may be retrieved from note database 116. In some embodiments, user may manually input element control datum 144.

With continued reference to FIG. 1, in some embodiments, processor 104 may generate element control datum 144 using a machine-learning module. In some embodiments, element control datum 144 may include an inferred solution. The inferred solution is a solution that is inferred based on context of note data 112. In a non-limiting example, processor 104 may infer a solution (e.g., element control datum 144) for a disease based on additional context provided by note data 112 or operational language elements 124. In some embodiments, processor 104 may be configured to generate element control training data. In a non-limiting example, element control training data may include correlations between exemplary operational language elements, exemplary scaled language elements, exemplary scaled language elements combined with exemplary element metadata, and/or exemplary element control datums. In some embodiments, element control training data may be stored in element database 128. In some embodiments, element control training data may be received from one or more users, element database 128, external computing devices, and/or previous iterations of processing. As a non-limiting example, element control training data may include instructions from a user, who may be an expert user, a past user in embodiments disclosed herein, or the like, which may be stored in memory and/or stored in element database 128, where the instructions may include labeling of training examples. In some embodiments, element control training data may be updated iteratively using a feedback loop. As a non-limiting example, processor 104 may update element control training data iteratively through a feedback loop as a function of note data 112, operational language element 124, element group 140, output of language processing module, scaled language elements 152, output of sentiment machine-learning model, output of group classifier, output of scaling machine-learning model, output of combining machine-learning model, or the like. In some embodiments, processor 104 may be configured to generate element control machine-learning model. In a non-limiting example, generating element control machine-learning model may include training, retraining, or fine-tuning element control machine-learning model using element control training data or updated element control training data. In some embodiments, processor 104 may be configured to generate element control datum 144 using element control machine-learning model (i.e. trained or updated element control machine-learning model). In some embodiments, a patient may be classified to a patient cohort using a cohort classifier and processor 104 may determine which element control datum 144 based on the patient cohort and the resulting output may be used to update element control training data.

With continued reference to FIG. 1, memory 108 contains instructions configuring processor 104 to display note data structure 172 using a graphical user interface 176. In some embodiments, processor 104 may generate a user interface displaying note data structure 172, note data 112, operational language element 124, scaled language element 152, element group 140, element metadata 164, scaled language element 152 combined with element metadata 164, element control datum 144, and the like. For the purposes of this disclosure, a "user interface" is a means by which a user and a computer system interact; for example through the use of input devices and software. A user interface may include a graphical user interface (GUI) 172, command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with user. In some embodiments, a user may interact with the use interface using a computing device distinct from and communicatively connected to processor 104. For example, a smart phone, smart, tablet, or laptop operated by a user. In an embodiment, user interface may include a graphical user interface 176. A "graphical user interface," as used herein, is a graphical form of user interface that allows users to interact with electronic devices. In some embodiments, GUI 176 may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface 176. For example, links to decentralized platforms as described in this disclosure may be incorporated using icons. Using an icon may be a fast way to open documents, run programs etc. because clicking on them yields instant access.

With continued reference to FIG. 1, in some embodiments, note data structure 172 may include a user input field. As used in this disclosure, a "user input field" is a graphical or interactive element in GUI that allows users to input or enter data. In some cases, user input field may be configured to receive user input containing data related to note data 112 or capture information from note data 112 provided by a user. In a non-limiting example, user input field may include a text box, a dropdown menu, a checkbox, a radio button, and/or any other interactive components that allows user to provide note data 112, operational language element 124, scaled language element 152, element group 140, element metadata 164, scaled language element 152 combined with element metadata 164, element control datum 144, user query datum, and the like. In some cases, user input field may include an event handler that respond to user interactions, wherein the "event handler," for the purpose of this disclosure, is a piece of computer program or software function that is associated with a specific event, such as entity submitting plurality of datasets 108 by interacting with corresponding user input field.

With continued reference to FIG. 1, in some embodiments, processor 104 may display user input field and receive a user query datum from the user input field. For the purposes of this disclosure, a "user query datum" is a single piece of information or an individual data point that is part of a user's search query or request in a database. As a non-limiting example, user query datum may include a user's search query or request in note database 116, element database 128, scaled database 156, meta database 168, or the like. For example, and without limitation, user query datum may include a user's search query or request related to medical domain categories such as neurology and cardiology, therapeutic interventions including drugs, vaccines, medical devices, and conservative therapies such as exercise and diet. In some embodiments, processor 104 may display a portion of note data structure 172 of note database 116, element data structure 132 of element database 128, scaled data structure 160 of scaled database 156, and the like as a function of user query datum. In a non-limiting example, if user query datum includes a request for information related to a specific health condition, processor 104 may display scaled language element 152 that is combined with element metadata 164 that is related to the specific health condition from note data structure 172. In some embodiments, processor 104 may display note data 112 that is related to user query datum. In a non-limiting example, processor 104 may flag or highlight a portion of note data 112 that is related to user query datum.

Figure 2A:
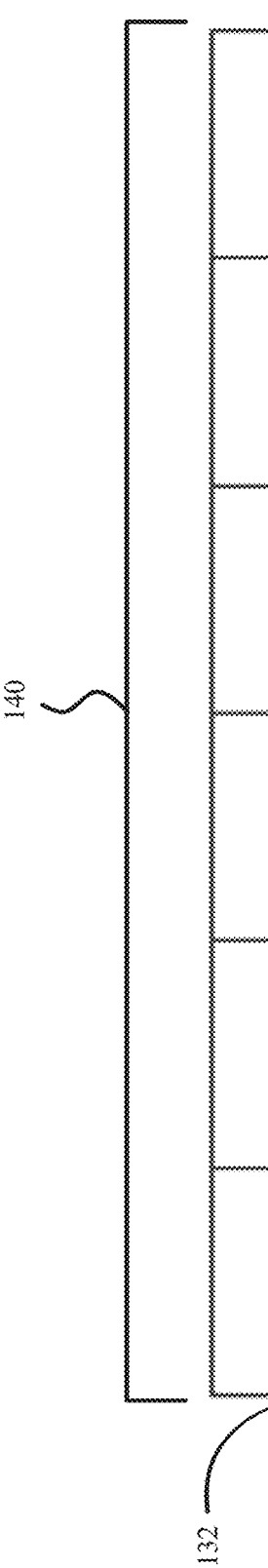
FIG. 2A illustrates an exemplary element data structure.

Referring now to FIG. 2A, an exemplary element data structure 132 is illustrated. In some embodiments, element data structure 132 or any data structure may include a text, image, graph, table, decision tree, or the like. As a non-limiting example, as shown in FIG. 2A, element data structure 132 may include a table that have a plurality of operational language elements 124 organized in rows and columns as a function of element groups 140.

Figure 2B:
FIG. 2B illustrates a comparison of an exemplary element data structure and an exemplary scaled data structure.

Referring now to FIG. 2B, a comparison of an exemplary element data structure 132 and an exemplary scaled data structure 160 is illustrated. In FIG. 2B, a portion of element data structure 132 and a portion scaled data structure 160 are placed next to each other to compare. Element data structure 132 may include operational language elements 124 and a portion scaled data structure 160 may include scaled language elements 152. For example, and without limitation, operational language elements 124, 'CPAP,' 'Continuous positive airway pressure,' and 'CPAP device' can be converted to scaled language element 152, 'Continuous positive airway pressure machine.'

Figure 2C:
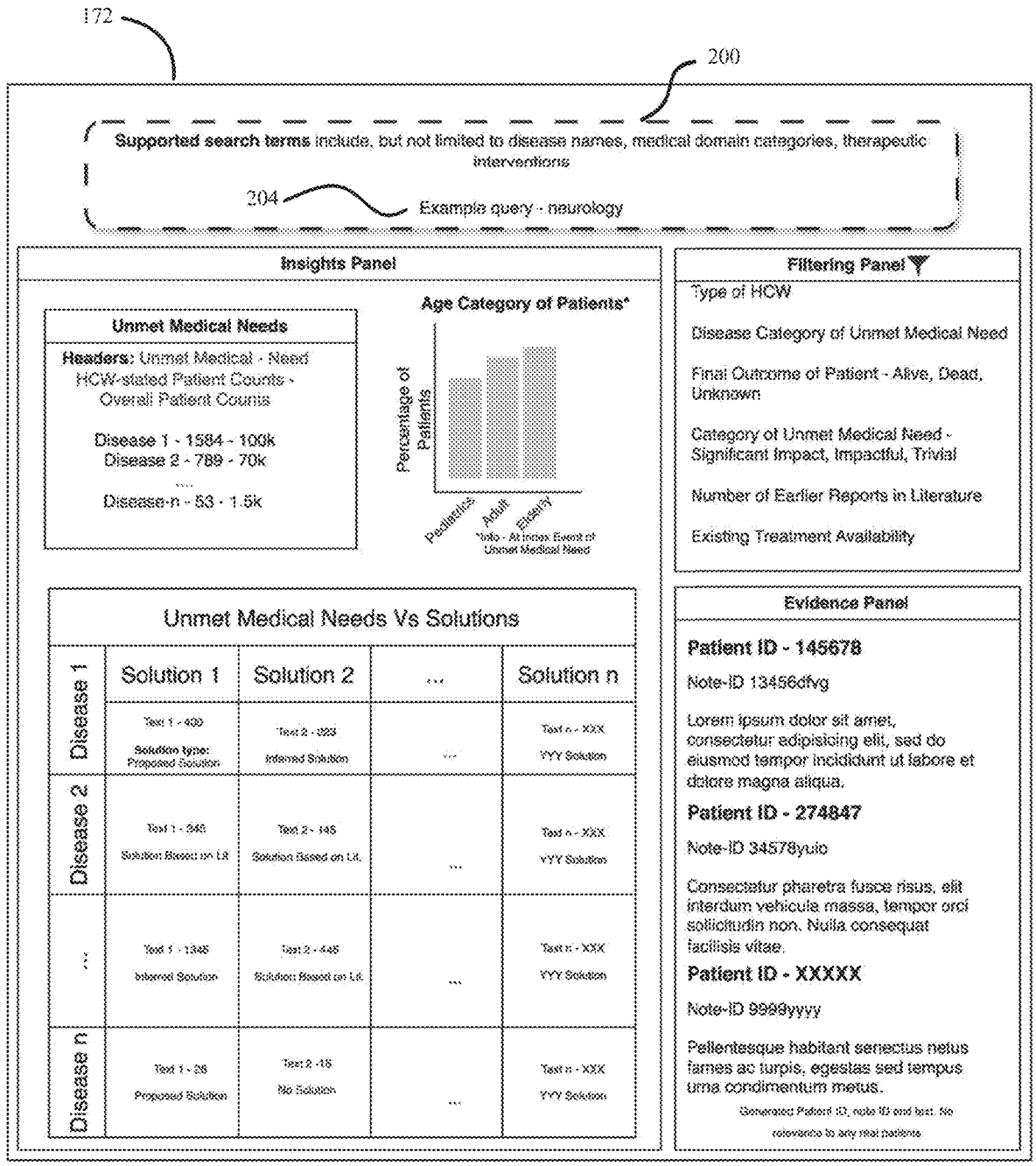
FIG. 2C illustrates an exemplary note data structure.

Referring now to FIG. 2C, an exemplary note data structure 172 is illustrated. In some embodiments, note data structure 172 may include a text, image, graph, table, or the like. In some embodiments, note data structure 172 may provide a summarization, representation, or otherwise abstraction of note data 112, operational language element 124, scaled language element 152, element control datum 144, element metadata 164, and any related data. In a non-limiting example, note data structure 172 may include a comprehensive report on note data 112. In another non-limiting example, note data structure 172 may include a list of disease or health condition names and related element control datum 144. In another non-limiting example, note data structure 172 may include a list of patient identifiers of note data 112 related to element control datum 144 as shown at an evidence panel section in FIG. 2C. In another non-limiting example, note data structure 172 may include a list of note identifiers of note data 112 related to element control datum 144 as shown at an evidence panel section in FIG. 2C. In another non-limiting example, note data structure 172 may include a portion of note data 112 that includes element control datum 144 as shown at an evidence panel section in FIG. 2C. For example, and without limitation, element control datum 144 may include element control language element, no-answer element control datum, and the like. In some embodiments, note data structure 172 may include a list of element groups 140 as shown at a filtering panel section in FIG. 2C. In some embodiments, note data structure 172 may include a list of diseases (e.g., unmet need language elements 126) and a plurality of solutions for the diseases (e.g., element control datum 144) as shown at an insights panel section in FIG. 2C. In some embodiments, note data structure 172 may include a graph that shows a plurality of patient cohorts or user cohorts and distribution of unmet need language elements 126 related to the user cohorts or patient cohorts. For example, and without limitation, a graph may show a plurality of patient cohorts related to patients' age and percentage of patients in each of the patient cohorts. In some embodiments, note data structure 172 may include a list of unmet need language elements 126 and related metadata of unmet need language elements 126. For example, and without limitation, note data structure 172 may include a list of unmet need language elements 126 and a number of patients (e.g., patient counts) related to the unmet need language elements 126 as shown at insight panel section in FIG. 2C.

With continued reference to FIG. 2C, in some embodiments, note data structure 172 may include a user input field 200. In some cases, user input field 200 may be configured to receive user input containing data related to note data 112 or capture information from note data 112 provided by a user. In a non-limiting example, user input field 200 may include a text box, a dropdown menu, a checkbox, a radio button, and/or any other interactive components that allows user to provide note data 112, operational language element 124, scaled language element 152, element group 140, element metadata 164, scaled language element 152 combined with element metadata 164, element control datum 144, user query datum 204, and the like. In some cases, user input field 200 may include an event handler that respond to user interactions.

With continued reference to FIG. 2C, in some embodiments, processor 104 may display user input field 200 and receive a user query datum 204 from the user input field 200. As a non-limiting example, user query datum 204 may include a user's search query or request in note database 116, element database 128, scaled database 156, meta database 168, or the like. For example, and without limitation, user query datum 204 may include a user's search query or request related to medical domain categories such as neurology and cardiology, therapeutic interventions including drugs, vaccines, medical devices, and conservative therapies such as exercise and diet. In some embodiments, processor 104 may display a portion of note data structure 172 of note database 116, element data structure 132 of element database 128, scaled data structure 160 of scaled database 156, and the like as a function of user query datum 204. In a non-limiting example, if user query datum 204 includes a request for information related to a specific health condition, processor 104 may display scaled language element 152 that is combined with element metadata 164 that is related to the specific health condition from note data structure 172. In some embodiments, processor 104 may display note data 112 that is related to user query datum 204. In a non-limiting example, processor 104 may flag or highlight a portion of note data 112 that is related to user query datum 204.

Figure 3B:
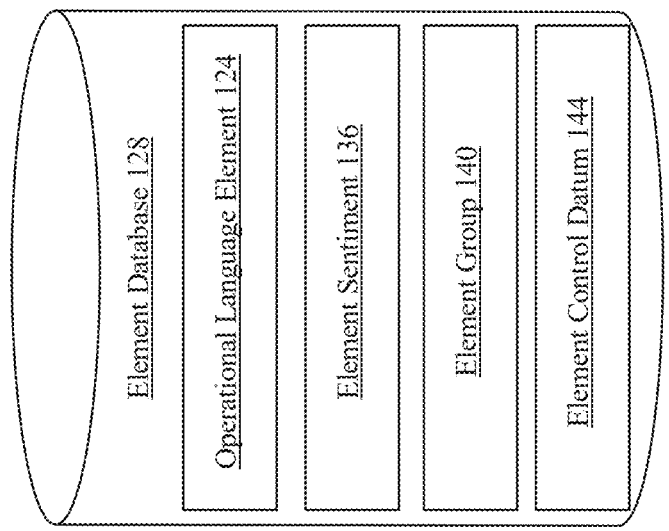
FIG. 3B illustrates a block diagram of an exemplary element database.
Figure 3A:
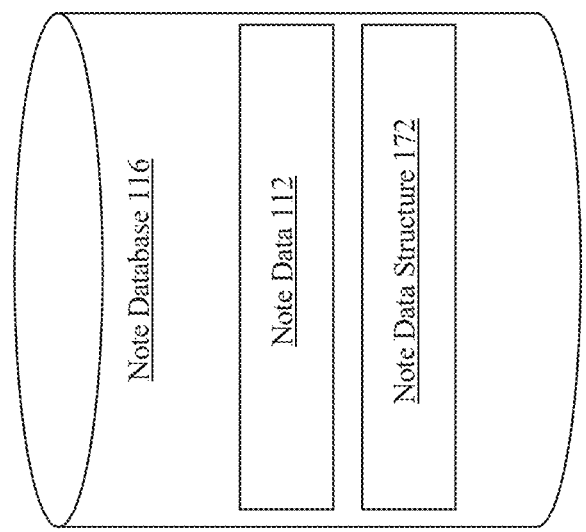
FIG. 3A illustrates a block diagram of an exemplary note database.

Referring now to FIG. 3A, a block diagram of an exemplary note database 116 is illustrated. In some embodiments, note database 116 may store note data 112, note data structure 172, and the like. In some embodiments, note database 116 may store user query datum 204, element control datum 144, input and output of LLM, LLM training data, and the like.

Referring now to FIG. 3B, a block diagram an exemplary element database 128 is illustrated. In some embodiments, element database 128 may store operational language element 124, element sentiment 136, sentiment training data, input and output of sentiment machine-learning model, input and output of OCT, input and output of language processing module, element group 140, group training data, input and output of group classifier, and the like.

Figure 3D:
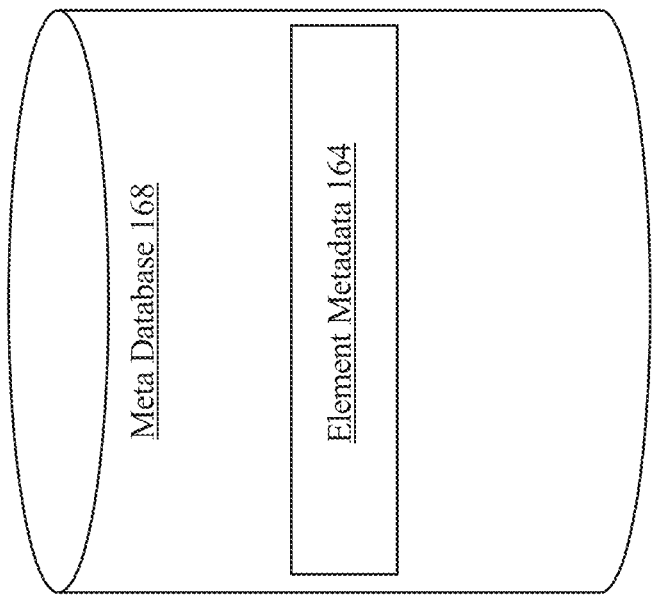
FIG. 3D illustrates a block diagram of an exemplary meta database.
Figure 3C:
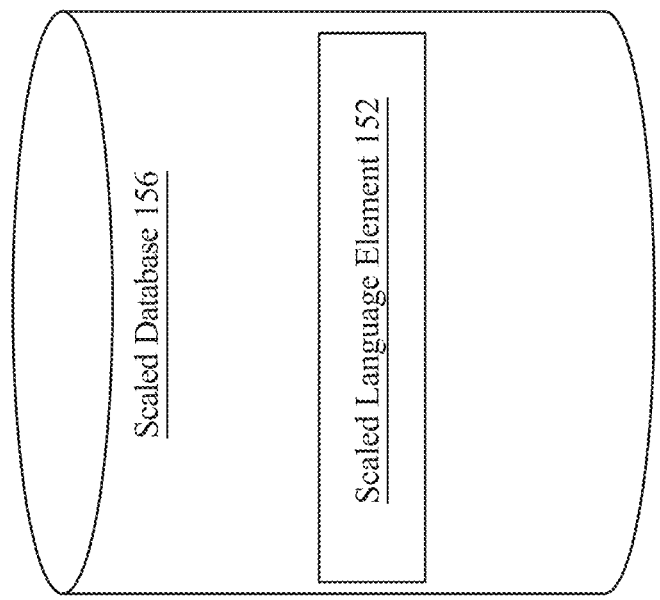
FIG. 3C illustrates a block diagram of an exemplary scaled database.

Referring now to FIG. 3C, a block diagram an exemplary scaled database 156 is illustrated. In some embodiments, scaled database 156 may store scaled language element 152, scaling training data, input and output of scaling machine-learning model, and the like.

Referring now to FIG. 3D, a block diagram an exemplary meta database 168 is illustrated. In some embodiments, meta database 168 may store element metadata 164.

Figure 4:
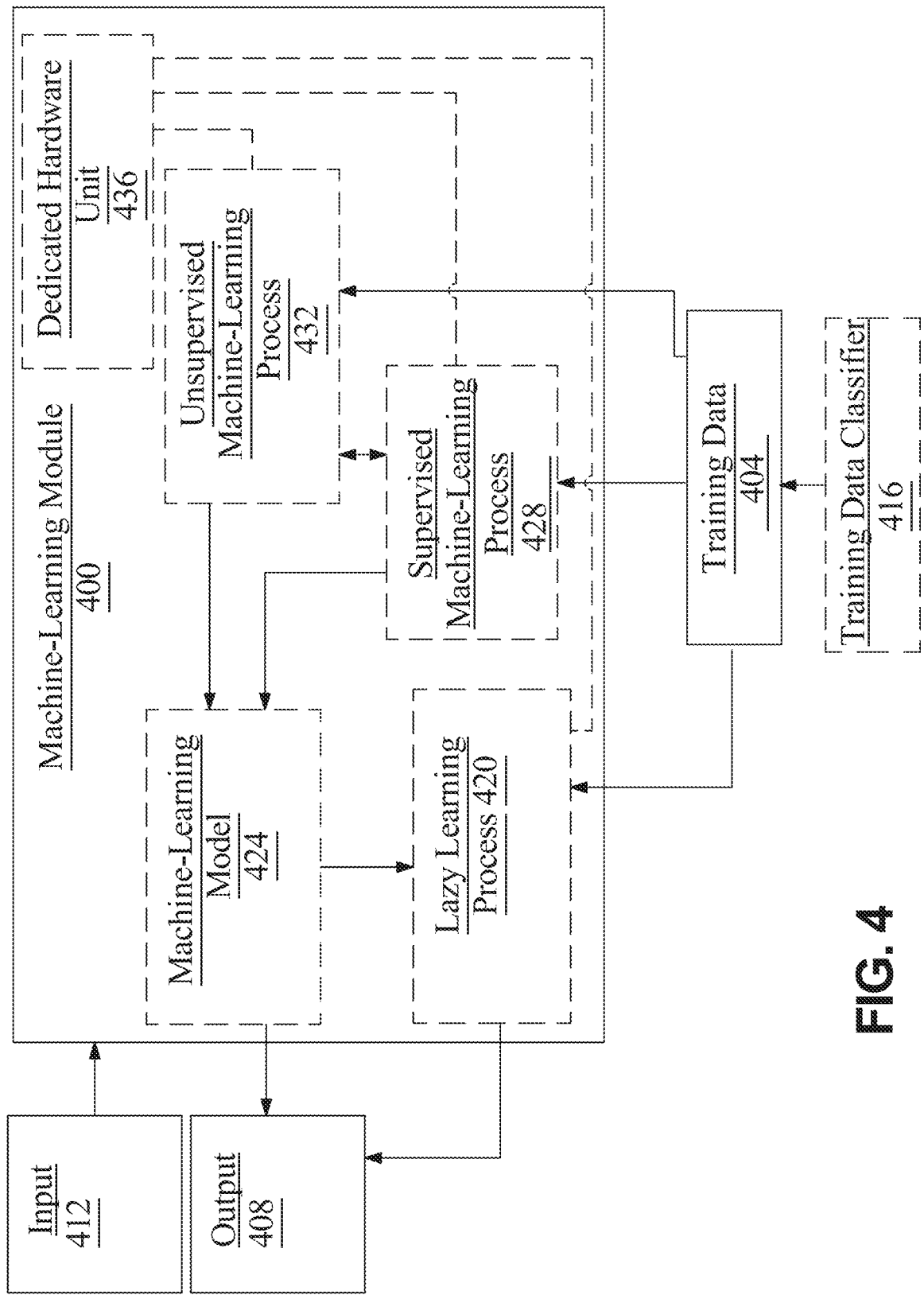
FIG. 4 illustrates a block diagram of an exemplary machine-learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm instantiated in hardware or software logic, data structures, and/or functions that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example, input data may include note data 112, operational language element 124, element sentiment 136, element groups 140, scaled language element 152, element metadata 164, element control datum 144, or the like. As a non-limiting illustrative example, output data may include operational language element 124, element sentiment 136, element groups 140, scaled language element 152, element metadata 164, element control datum 144, note data structure 172, or the like.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to a user cohort, patient cohort, or the like. For example, and without limitation, user cohort may include cohorts of age, gender, experience, field of occupation, or the like of a user. For example, and without limitation, patient cohort may include age, gender, life style, weight, existing health conditions, or the like of a patient.

Still referring to FIG. 4, Computing device may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)+P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device may then calculate a likelihood table by calculating probabilities of different data entries and classification labels. Computing device may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 4, Computing device may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 4, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\Sigma_{i=0}^{n}a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Continuing to refer to FIG. 4, computer, processor, and/or module may be configured to preprocess training data. "Preprocessing" training data, as used in this disclosure, is transforming training data from raw form to a format that can be used for training a machine learning model. Preprocessing may include sanitizing, feature selection, feature scaling, data augmentation and the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value. Sanitizing may include steps such as removing duplicative or otherwise redundant data, interpolating missing data, correcting data errors, standardizing data, identifying outliers, and the like. In a nonlimiting example, sanitization may include utilizing algorithms for identifying duplicate entries or spell-check algorithms.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may down-sample the high pixel count image to convert the 256 pixels into 128 pixels. In some embodiments, processor may be configured to perform downsampling on data. Downsampling, also known as decimation, may include removing every entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Further referring to FIG. 4, feature selection includes narrowing and/or filtering training data to exclude features and/or elements, or training data including such elements, that are not relevant to a purpose for which a trained machine-learning model and/or algorithm is being trained, and/or collection of features and/or elements, or training data including such elements, on the basis of relevance or utility for an intended task or purpose for a trained machine-learning model and/or algorithm is being trained. Feature selection may be implemented, without limitation, using any process described in this disclosure, including without limitation using training data classifiers, exclusion of outliers, or the like.

With continued reference to FIG. 4, feature scaling may include, without limitation, normalization of data entries, which may be accomplished by dividing numerical fields by norms thereof, for instance as performed for vector normalization. Feature scaling may include absolute maximum scaling, wherein each quantitative datum is divided by the maximum absolute value of all quantitative data of a set or subset of quantitative data. Feature scaling may include min-max scaling, in which each value X has a minimum value $X_{min}$ in a set or subset of values subtracted therefrom, with the result divided by the range of the values, give maximum value in the set or subset $X_{max}$: $X_{new} = X - X_{min}/X_{max} - X_{min}$. Feature scaling may include mean normalization, which $X_{max} - X_{min}$ involves use of a mean value of a set and/or subset of values, $X_{mean}$ with maximum and minimum values:

$$X_{new} = \frac{X - X_{mean}}{X_{max} - X_{min}}.$$

Feature scaling may include standardization, where a difference between X and $X_{mean}$ is divided by a standard deviation σ of a set or subset of values:

$$X_{new} = \frac{X - X_{mean}}{\sigma}.$$

Scaling may be performed using a median value of a set or subset $X_{median}$ and/or interquartile range (IQR), which represents the difference between the 25$^{th}$ percentile value and the 40$^{th}$ percentile value (or closest values thereto by a rounding protocol), such as:

$$X_{new} = \frac{X - X_{median}}{IQR}.$$

Persons skilled in the art, upon reviewing the entirety of this disclosure, will be aware of various alternative or additional approaches that may be used for feature scaling.

Further referring to FIG. 4, computing device, processor, and/or module may be configured to perform one or more processes of data augmentation. "Data augmentation" as used in this disclosure is addition of data to a training set using elements and/or entries already in the dataset. Data augmentation may be accomplished, without limitation, using interpolation, generation of modified copies of existing entries and/or examples, and/or one or more generative AI processes, for instance using deep neural networks and/or generative adversarial networks; generative processes may be referred to alternatively in this context as "data synthesis" and as creating "synthetic data." Augmentation may include performing one or more transformations on data, such as geometric, color space, affine, brightness, cropping, and/or contrast transformations of images.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428.

At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include note data 112, operational language element 124, element sentiment 136, element groups 140, scaled language element 152, element metadata 164, element control datum 144, or the like as described above as inputs, operational language element 124, element sentiment 136, element groups 140, scaled language element 152, element metadata 164, element control datum 144, note data structure 172, or the like as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
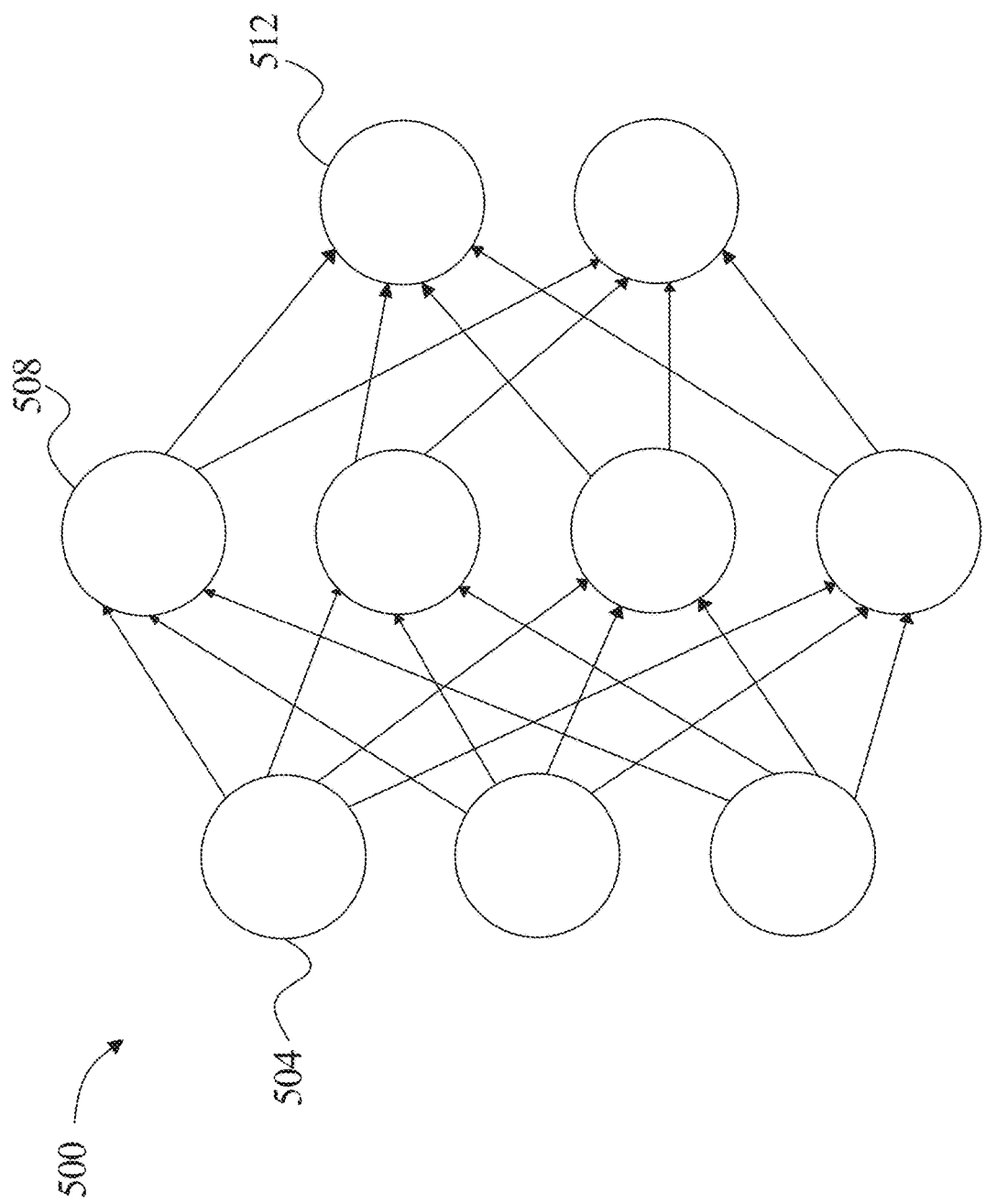
FIG. 5 illustrates a diagram of an exemplary neural network.

Referring now to FIG. 5, an exemplary embodiment of neural network 500 is illustrated. A neural network 500 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 504, one or more intermediate layers 508, and an output layer of nodes 512. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 6:
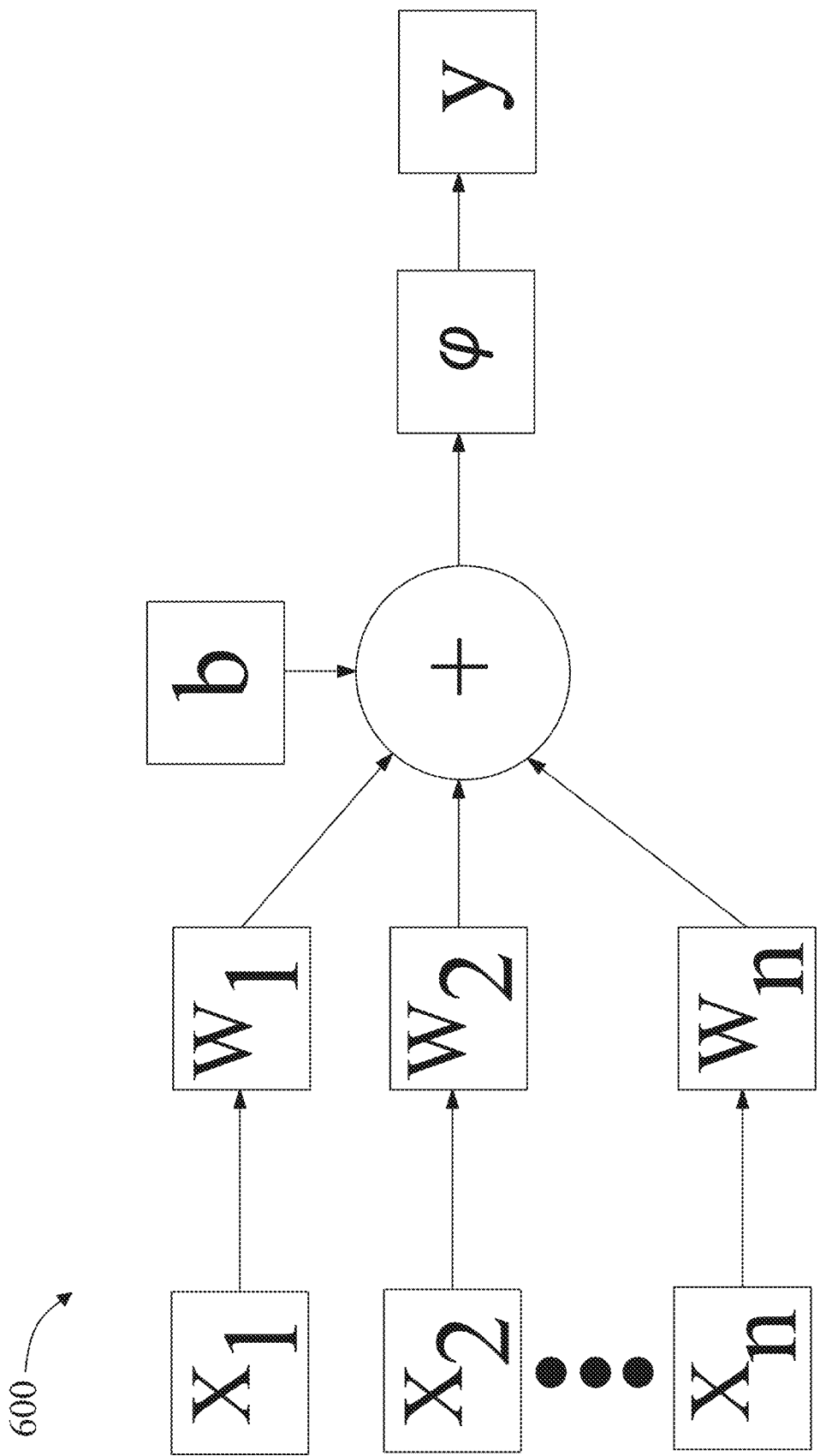
FIG. 6 illustrates a block diagram of an exemplary node in a neural network.

Referring now to FIG. 6 an exemplary embodiment of a node 600 of a neural network is illustrated. A node may include, without limitation, a plurality of inputs $x_i$ that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1 - e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x \text{ for } x \geq 0 \\ \alpha(e^x - 1) \text{ for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) \text{ for } x < 0 \\ x \text{ for } x \geq 0 \end{cases}.$$

Fundamentally, there is no limit to the nature of functions of inputs $x_i$ that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 7A:
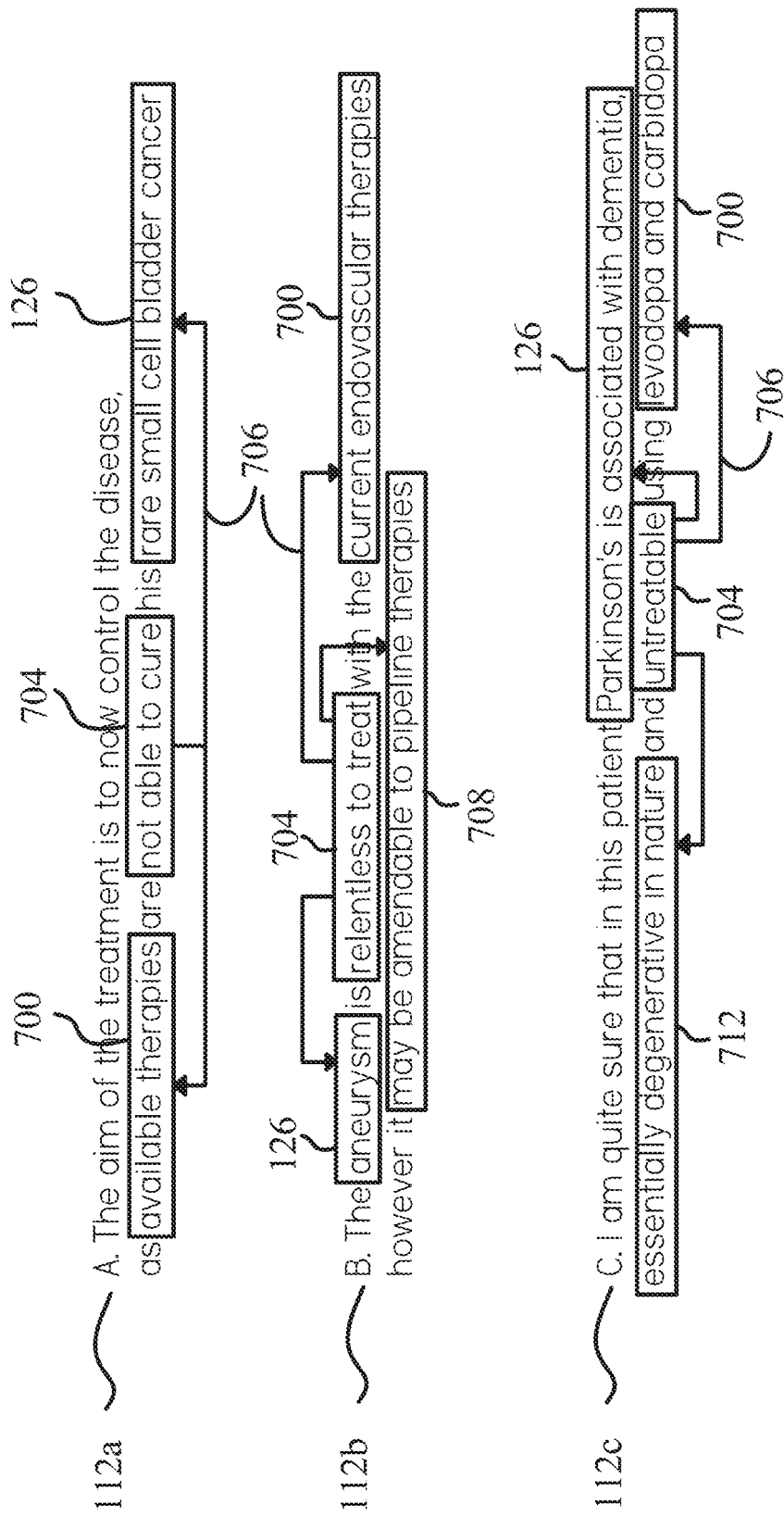
FIG. 7A illustrates exemplary operational language elements in a plurality of sets of note data.

Referring now to FIG. 7A, a configuration of exemplary operational language elements 124 in a plurality of sets of note data 112a-c is illustrated. The note data 112a-c illustrated in FIG. 7 are exemplary and persons skilled in the art, upon reviewing the entirety of this disclosure, may appreciate various note data 112a-c there can be. In note data 112a, it says 'The aim of the treatment is to now control the disease, as available therapies are not able to cure his rare small cell bladder cancer.' In some embodiments, processor 104 may analyze note data 112a and determine a plurality of operational language elements 124 using LLM and/or NLP. As a non-limiting example, processor 104 may determine 'rare small cell bladder cancer' as unmet need language element 126, 'available therapies' as failed element control language element 700, and 'not able to cure' as a sentiment language element 704. In some embodiments, processor 104 may classify plurality of operational language elements 124 into one or more element groups 140 and determine element connection 706 of element groups 140. In some embodiments, each element group 140 may include an element connection 706. As a non-limiting example, one element group 140 may have element connection 706 with multiple element groups 140. For example, and without limitation, in case of note data 112a, sentiment language element 704 'not able to cure' may have element connection 706 with failed element control language element 700 'available therapies' and unmet need language element 126 'rare small cell bladder cancer.' Continuing the non-limiting example, the element connection 706 between sentiment language element 704 'not able to cure' and failed element control language element 700 'available therapies' may indicate that a disease is 'not able to cure' using 'available therapies.' Continuing the non-limiting example, the element connection 706 between sentiment language element 704 'not able to cure' and unmet need language element 126 'rare small cell bladder cancer' may indicate that a disease 'rare small cell bladder cancer' is the disease that is 'not able to cure.'

With continued reference to FIG. 7A, in note data 112b, it says 'The aneurysm is relentless to treat with the current endovascular therapies, however it may be amendable to pipeline therapies.' In some embodiments, processor 104 may analyze note data 112b and determine a plurality of operational language elements 124 using LLM and/or NLP. As a non-limiting example, processor 104 may determine 'aneurysm' as unmet need language element 126, 'current endovascular therapies' as failed element control language element 700, 'relentless to treat' as a sentiment language element 704, and 'may be amendable to pipeline therapies' as an element control language element 708.

With continued reference to FIG. 7A, in a non-limiting example, in case of note data 112b, sentiment language element 704 'relentless to treat' may have element connection 706 with failed element control language element 700 'current endovascular therapies,' unmet need language element 126 'aneurysm' and element control language element 708 'may be amendable to pipeline therapies.' Continuing the non-limiting example, the element connection 706 between sentiment language element 704 'relentless to treat' and failed element control language element 700 'current endovascular therapies' may indicate that a disease is 'relentless to treat' using 'current endovascular therapies.' Continuing the non-limiting example, the element connection 706 between sentiment language element 704 'relentless to treat' and unmet need language element 126 'aneurysm' may indicate that a disease 'aneurysm' is the disease that is 'relentless to treat.' Continuing the non-limiting example, the element connection 706 between element control language element 708 'may be amendable to pipeline therapies' and unmet need language element 126 'aneurysm' may indicate that a disease 'aneurysm' is the disease that 'may be amendable to pipeline therapies.'

With continued reference to FIG. 7A, in note data 112c, it says 'I am quite sure that in this patient Parkinson's is associated with dementia, essentially degenerative in nature and untreatable using levodopa and carbidopa.' In some embodiments, processor 104 may analyze note data 112c and determine a plurality of operational language elements 124 using LLM and/or NLP. As a non-limiting example, processor 104 may determine 'Parkinson's is associated with dementia' as unmet need language element 126, 'levodopa and carbidopa' as failed element control language element 700, 'untreatable' as a sentiment language element 704, and 'essentially degenerative in nature' as operational language element that is additional information 712.

With continued reference to FIG. 7A, in a non-limiting example, in case of note data 112c, sentiment language element 704 'untreatable' may have element connection 706 with failed element control language element 700 'levodopa and carbidopa,' unmet need language element 126 'Parkinson's is associated with dementia' and additional information 712 'essentially degenerative in nature.' Continuing the non-limiting example, the element connection 706 between sentiment language element 704 'untreatable' and failed element control language element 700 'levodopa and carbidopa' may indicate that a disease is 'untreatable' using 'levodopa and carbidopa.' Continuing the non-limiting example, the element connection 706 between sentiment language element 704 'untreatable' and unmet need language element 126 'Parkinson's is associated with dementia' may indicate that a disease 'Parkinson's is associated with dementia' is the disease that is 'relentless to treat.' Continuing the non-limiting example, the element connection 706 between sentiment language element 704 'untreatable' and additional information 712 'essentially degenerative in nature' may indicate that 'untreatable' means or related to 'essentially degenerative in nature'.

Figure 7B:
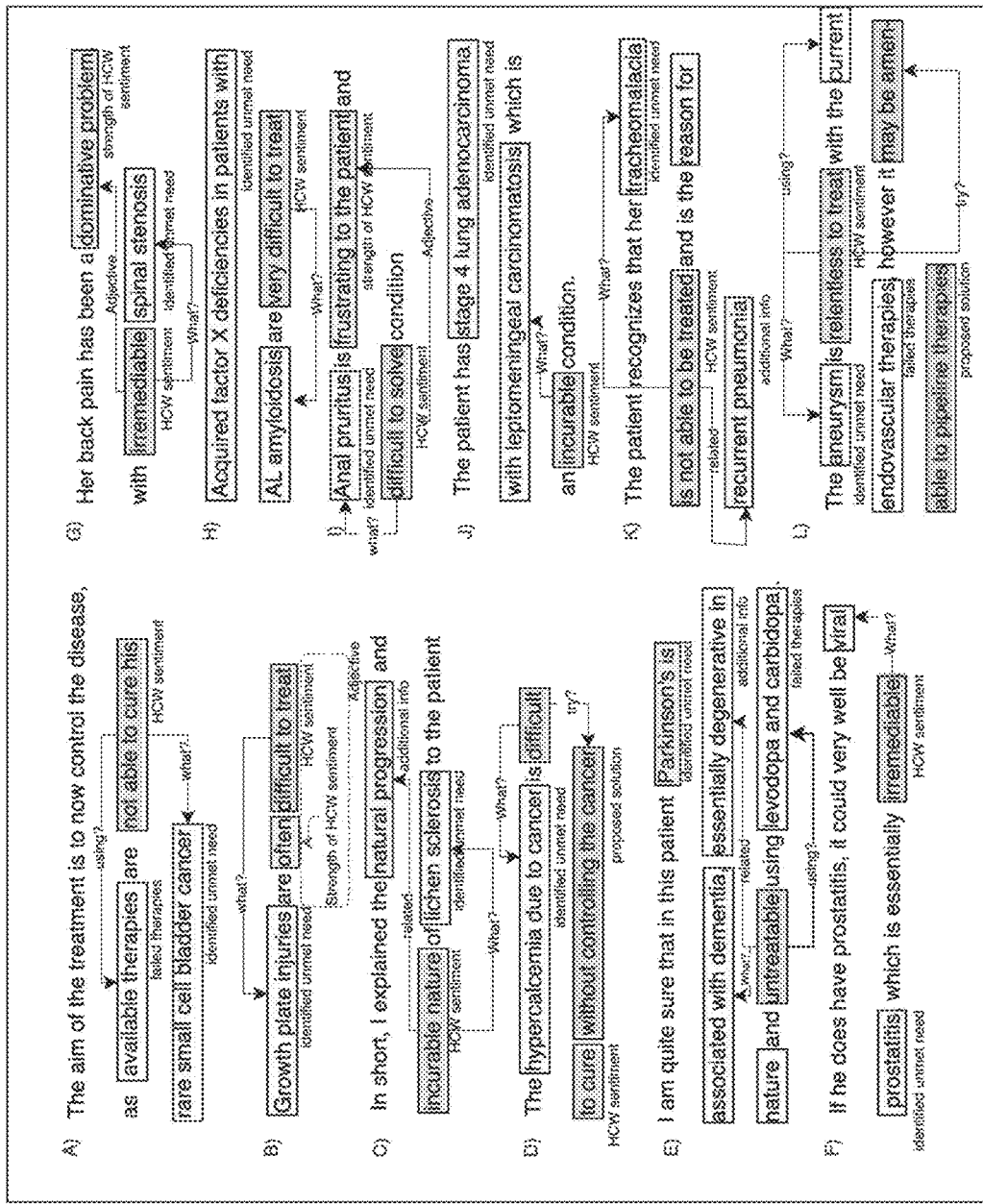
FIG. 7B illustrates another exemplary operational language elements in a plurality of sets of note data.

Referring now to FIG. 7B, another exemplary operational language elements 124 in a plurality of sets of note data 112A-L are illustrated. As shown in FIG. 7B, a plurality of operational language elements 124 are boxed in note data 112A-L and associations between the plurality of operational language elements 124 are illustrated with arrows connecting two different operational language elements 124. For example, and without limitation, in note data 112E, it says 'I am quite sure that in this patient Parkinson's is associated with dementia, essentially degenerative in nature and untreatable using levodopa and carbidopa.' In some embodiments, processor 104 may analyze note data 112E and determine a plurality of operational language elements 124 using LLM and/or NLP. As a non-limiting example, processor 104 may determine 'Parkinson's is associated with dementia' as unmet need language element 126 (e.g., illustrated as 'identified unmet need' in FIG. 7B), 'levodopa and carbidopa' as failed element control language element 700 (e.g., illustrated as 'failed therapies' in FIG. 7B), 'untreatable' as a sentiment language element 704, and 'essentially degenerative in nature' as operational language element that is additional information 712 (e.g., illustrated as 'additional info' in FIG. 7B). As another non-limiting example, processor 104 associate a plurality of operational language elements 124. For example, and without limitation, in FIG. 7B, an arrow from 'untreatable' to 'essentially degenerative in nature' illustrates that 'essentially degenerative in nature' is 'related to' 'untreatable.' For example, and without limitation, in FIG. 7B, an arrow from 'untreatable' to 'Parkinson's is associated with dementia' illustrates that 'what' is 'untreatable,' which is 'Parkinson's is associated with dementia.' For example, and without limitation, in FIG. 7B, an arrow from 'untreatable' to 'levodopa and carbidopa' illustrates that an identified unmet need is 'untreatable' 'using' 'levodopa and carbidopa'.

With continued reference to FIG. 7B, for example, and without limitation, in note data 112L, it says 'I am quite sure that in this patient Parkinson's is associated with dementia, essentially degenerative in nature and untreatable using levodopa and carbidopa.' In some embodiments, processor 104 may analyze note data 112L and determine a plurality of operational language elements 124 using LLM and/or NLP. For example, and without limitation, in note data 112E, it says 'The aneurysm is relentless to treat with the current endovascular therapies, however it may be amendable to pipeline therapies.' As a non-limiting example, processor 104 may determine 'aneurysm' as unmet need language element 126, 'current endovascular therapies' as failed element control language element 700, 'relentless to treat' as a sentiment language element 704, and 'may be amendable to pipeline therapies' as a proposed solution stated by a health care worker (e.g., element control language element 708).

Figure 8:
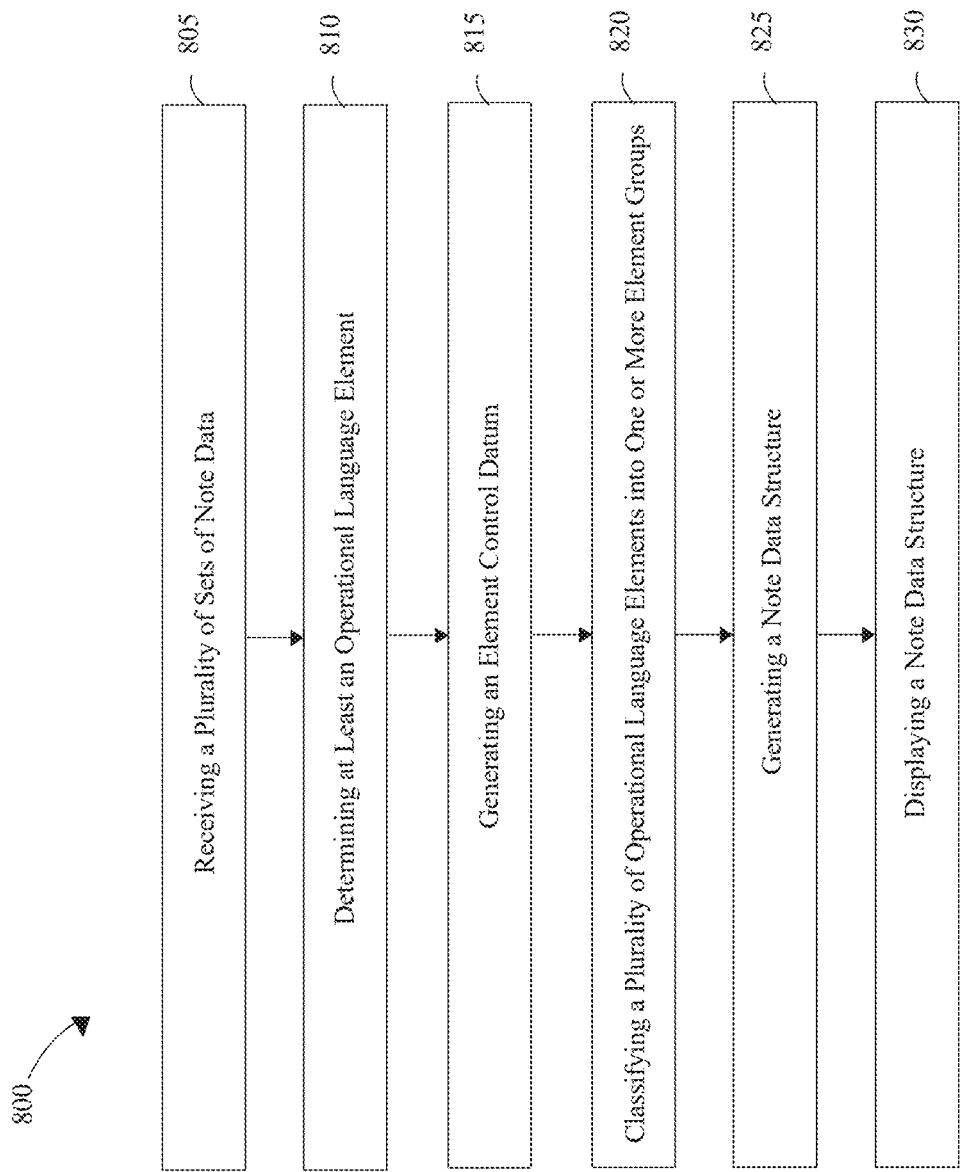
FIG. 8 illustrates a flow diagram of an exemplary method for note data analysis for unmet need identification, solution distillation and data structure generation.

Referring now to FIG. 8, a flow diagram of an exemplary method 800 for note data analysis for unmet need identification, solution distillation and data structure generation is illustrated. Method 800 contains a step 805 of receiving, using at least a processor, a plurality of sets of note data, wherein the plurality of sets of note data includes a variety of information related to a plurality of subjects generated by a plurality of users. This may be implemented as referenced to FIGS. 1-7.

With continued reference to FIG. 8, method 800 contains a step 810 of determining, using at least a processor, a plurality of operational language elements from a plurality of sets of note data. In some embodiments, determining the plurality of operational language elements may include generating an element database as a function of the plurality of operational language elements, wherein the element database comprises an element data structure. In some embodiments, determining the plurality of operational language elements may include storing a failed element control language element of the plurality of operational language elements in the element database. In some embodiments, determining the plurality of operational language elements may include determining an element sentiment of a sentiment language element of the plurality of operational language elements, wherein the element sentiment comprises a negative sentiment and storing the sentiment language element in the element database. In some embodiments, determining the plurality of operational language elements may include determining an identifier language element of the plurality of operational language elements and storing the identifier language element in the element database. In some embodiments, method 800 may further include converting, using the at least a processor, the plurality of operational language elements to a scaled language elements, combining, using the at least a processor, element metadata with the scaled language element and generating, using the at least a processor, the note data structure as a function of the combination of the element metadata and the scaled language element. In some embodiments, generating the scaled language element may include generating a scaled database as a function of the scaled language element, wherein the scaled database may include a scaled data structure. In some embodiments, generating the note data structure may include generating the note data structure as a function of the scaled data structure of the scaled database. In some embodiments, combining the element metadata to the scaled language element may include retrieving, from the plurality of sets of note data, element metadata relating to the plurality of sets of note data, wherein the element metadata comprises author data, determining an author count as a function of the author data and storing the author count in the note database. These may be implemented as referenced to FIGS. 1-7.

With continued reference to FIG. 8, method 800 contains a step 815 of generating, using at least a processor, an element control datum as a function of an unmet need language element of a plurality of operational language elements. In some embodiments, wherein generating the element control datum may include retrieving an element control language element from the element database and retrieving the element control datum from an external data source as a function of an unmet need language element of the plurality of operational language elements, wherein the element control datum may include a no-answer element control datum. These may be implemented as referenced to FIGS. 1-7.

With continued reference to FIG. 8, method 800 contains a step 820 of classifying, using at least a processor, the plurality of operational language elements into one or more element groups. This may be implemented as referenced to FIGS. 1-7.

With continued reference to FIG. 8, method 800 contains a step 825 of generating, using at least a processor, a note data structure as a function of one or more element groups and an element control datum. This may be implemented as referenced to FIGS. 1-7.

With continued reference to FIG. 8, method 800 contains a step 830 of displaying, using at least a processor, a note data structure using a graphical user interface. This may be implemented as referenced to FIGS. 1-7.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
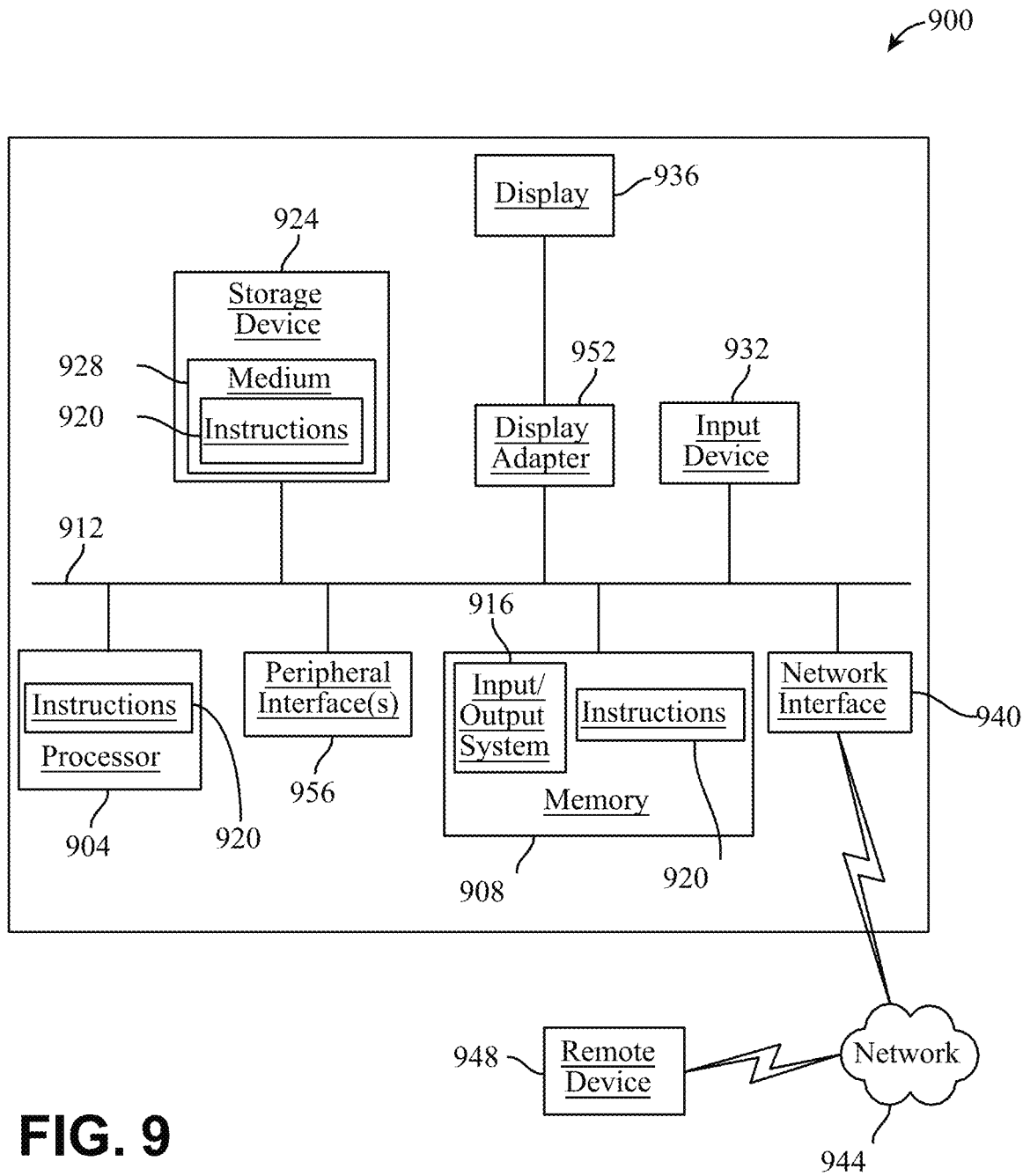
FIG. 9 illustrates a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and memory 908 that communicate with each other, and with other components, via a bus 912. Bus 912 may include any of several types of bus structures including, but not limited to, memory bus, memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for note data analysis for unmet need identification, solution distillation and data structure generation, the apparatus comprising:
   at least a processor; and
   a memory communicatively connected to the at least a processor, wherein the memory contains instructions configuring the at least a processor to:
      receive a plurality of sets of note data, wherein the plurality of sets of note data comprises a variety of information related to a plurality of subjects generated by a plurality of users;
      determine a plurality of operational language elements from the plurality of sets of note data, wherein the plurality of operational language elements comprises an unmet need language element and wherein determining the plurality of operational language elements comprises:
         converting the plurality of sets of note data into a plurality of vectors in order to reduce a dimensionality of the plurality of sets of note data;
         extracting, the plurality of operational language elements by identifying a degree of vector similarity between at least one vector within the plurality of vectors and a vector representing another language element;
         identifying, using a large language model, an element connection within each of the plurality of operational language elements; and
         identifying the unmet need language element as a function of the element connection;
      generate an element control datum as a function of the unmet need language element of the plurality of operational language elements;
      classify the plurality of operational language elements into one or more element groups;
      generate a note data structure as a function of the one or more element groups and the element control datum; and
      display the note data structure using a graphical user interface.

2. The apparatus of claim 1, wherein determining the plurality of operational language elements comprises generating an element database as a function of the plurality of operational language elements, wherein the element database comprises an element data structure.

3. The apparatus of claim 2, wherein determining the plurality of operational language elements comprises storing a failed element control language element of the plurality of operational language elements in the element database.

4. The apparatus of claim 2, wherein generating the element control datum comprises:
   retrieving an element control language element from the element database; and
   retrieving the element control datum from an external data source as a function of the unmet need language element of the plurality of operational language elements,
   wherein the element control datum comprises a no-answer element control datum.

5. The apparatus of claim 2, wherein determining the plurality of operational language elements comprises:
   determining an element sentiment of a sentiment language element of the plurality of operational language elements, wherein the element sentiment comprises a negative sentiment; and
   storing the sentiment language element in the element database.

6. The apparatus of claim 2, wherein determining the plurality of operational language elements comprises:
   determining an identifier language element of the plurality of operational language elements; and
   storing the identifier language element in the element database.

7. The apparatus of claim 1, wherein the memory contains instructions further configuring the at least a processor to:

convert the plurality of operational language elements to a scaled language element;

combine element metadata with the scaled language element; and generate the note data structure as a function of the combination of the element metadata and the scaled language element.

8. The apparatus of claim 7, wherein generating the scaled language element comprises generating a scaled database as a function of the scaled language element, wherein the scaled database comprises a scaled data structure.

9. The apparatus of claim 8, wherein generating the note data structure comprises generating the note data structure as a function of the scaled data structure of the scaled database.

10. The apparatus of claim 7, wherein combining the element metadata with the scaled language element comprises:

retrieving, from the plurality of sets of note data, element metadata relating to the plurality of sets of note data, wherein the element metadata comprises author data;

determining an author count as a function of the author data; and storing the author count in a note database.

11. A method for note data analysis for unmet need identification, solution distillation and data structure generation, the method comprising:

receiving, using at least a processor, a plurality of sets of note data, wherein the plurality of sets of note data comprises a variety of information related to a plurality of subjects generated by a plurality of users;

determining, using the at least a processor, a plurality of operational language elements from the plurality of sets of note data, wherein the plurality of operational language elements comprises an unmet need language element and wherein determining the plurality of operational language elements comprises:

converting the plurality of sets of note data into a plurality of vectors in order to reduce a dimensionality of the plurality of sets of note data;

extracting, the plurality of operational language elements by identifying a degree of vector similarity between at least one vector within the plurality of vectors and a vector representing another language element;

identifying, using a large language model, an element connection within each of the plurality of operational language elements; and identifying the unmet need language element as a function of the element connection;

generating, using the at least a processor, an element control datum as a function of the unmet need language element of the plurality of operational language elements;

classifying, using the at least a processor, the plurality of operational language elements into one or more element groups;

generating, using the at least a processor, a note data structure as a function of the one or more element groups and the element control datum; and displaying, using the at least a processor, the note data structure using a graphical user interface.

12. The method of claim 11, wherein determining the plurality of operational language elements comprises generating an element database as a function of the plurality of operational language elements, wherein the element database comprises an element data structure.

13. The method of claim 12, wherein determining the plurality of operational language elements comprises storing a failed element control language element of the plurality of operational language elements in the element database.

14. The method of claim 12, wherein generating the element control datum comprises:

retrieving an element control language element from the element database; and retrieving the element control datum from an external data source as a function of the unmet need language element of the plurality of operational language elements, wherein the element control datum comprises a no-answer element control datum.

15. The method of claim 12, wherein determining the plurality of operational language elements comprises:

determining an element sentiment of a sentiment language element of the plurality of operational language elements, wherein the element sentiment comprises a negative sentiment; and storing the sentiment language element in the element database.

16. The method of claim 12, wherein determining the plurality of operational language elements comprises:

determining an identifier language element of the plurality of operational language elements; and storing the identifier language element in the element database.

17. The method of claim 11, further comprising:

converting, using the at least a processor, the plurality of operational language elements to a scaled language elements;

combining, using the at least a processor, element metadata with the scaled language element; and generating, using the at least a processor, the note data structure as a function of the combination of the element metadata and the scaled language element.

18. The method of claim 17, wherein generating the scaled language element comprises generating a scaled database as a function of the scaled language element, wherein the scaled database comprises a scaled data structure.

19. The method of claim 18, wherein generating the note data structure comprises generating the note data structure as a function of the scaled data structure of the scaled database.

20. The method of claim 17, wherein combining the element metadata to the scaled language element comprises:

retrieving, from the plurality of sets of note data, element metadata relating to the plurality of sets of note data, wherein the element metadata comprises author data;

determining an author count as a function of the author data; and storing the author count in a note database.

* * * * *